US012241265B2

(12) United States Patent
Southby

(10) Patent No.: US 12,241,265 B2
(45) Date of Patent: Mar. 4, 2025

(54) HANDLE ATTACHMENT FOR AN ADHESIVE SPREADER

(71) Applicant: Roy Tiles Pty Limited, Adelaide (AU)

(72) Inventor: Roydon Charles Southby, Highbury (AU)

(73) Assignee: Roy Tiled Pty Limited, Adelaide (AU)

( * ) Notice: Subject to any disclaimer, the term of this patent is extended or adjusted under 35 U.S.C. 154(b) by 315 days.

(21) Appl. No.: 17/797,641

(22) PCT Filed: Feb. 5, 2021

(86) PCT No.: PCT/AU2021/000010
§ 371 (c)(1),
(2) Date: Aug. 4, 2022

(87) PCT Pub. No.: WO2021/155424
PCT Pub. Date: Aug. 12, 2021

(65) Prior Publication Data

US 2023/0085237 A1 Mar. 16, 2023

(30) Foreign Application Priority Data

Feb. 7, 2020 (AU) ................................ 2020900345
Jul. 17, 2020 (AU) ................................ 2020902488

(51) Int. Cl.
*E04F 21/16* (2006.01)
*B05C 17/10* (2006.01)
(Continued)

(52) U.S. Cl.
CPC ............ *E04F 21/162* (2013.01); *B05C 17/10* (2013.01); *B25G 3/30* (2013.01); *E04F 21/023* (2013.01)

(58) Field of Classification Search
CPC ....... E04F 21/162; E04F 21/023; E04F 21/16; B05C 17/10
See application file for complete search history.

(56) References Cited

U.S. PATENT DOCUMENTS 3,803,662 A * 4/1974 Glejf ..................... E04F 21/241 15/245.1
5,225,799 A * 7/1993 West ....................... H01P 1/205 333/202

(Continued)

FOREIGN PATENT DOCUMENTS

FR 2881449 A1 * 8/2006 .............. E04F 21/06
FR 2 881 449 B1 4/2008
KR 101574329 B1 * 12/2015

OTHER PUBLICATIONS

International Search Report and Written Opinion for International Application No. PCT/AU2021/000010, mailed on Apr. 27, 2021, 25 pages.

*Primary Examiner* — Marc Carlson
(74) *Attorney, Agent, or Firm* — Westman, Champlin & Koehler, P.A.

(57) ABSTRACT

When spreading adhesive, an adhesive spreader tool and adaptor for attachment to a handle, the adaptor and spreader tool for spreading adhesive over a floor surface from a standing position. The spreader tool includes two sheets each sheet folded along respective at least one slot to form a folded portion of the sheet. Once the two sheets are joined they form an array of castellations along respective first sides of the joined sheets and end walls formed by the folded portions, the sheets suitable for spreading adhesive over the floor the width of a tile. The adaptor is configured to engage the adhesive spreader tool and has first and second longitudinal support members adapted to be slidable within a first channel or one in each of two channels so that the support members support.

5 Claims, 15 Drawing Sheets

(51) Int. Cl.

| | |
|---|---|
| ***B25G 3/30*** | (2006.01) |
| ***E04F 21/02*** | (2006.01) |

(56) References Cited

U.S. PATENT DOCUMENTS

| | | | | | |
|---|---|---|---|---|---|
| 5,379,479 | A * | 1/1995 | Nelson | E04F 21/20 | 15/245.1 |
| 6,210,037 | B1 * | 4/2001 | Brandon, Jr. | A45C 13/02 | 383/111 |
| 6,308,370 | B1 * | 10/2001 | Southby | E04F 21/20 | 15/236.08 |
| 9,140,021 | B2 * | 9/2015 | Ljungstrom | E04F 21/023 | |
| 2004/0173145 | A1 * | 9/2004 | Rytter | E04D 15/04 | 118/305 |
| 2009/0297740 | A1 * | 12/2009 | Durney | E04C 2/34 | 72/379.4 |
| 2011/0059330 | A1 * | 3/2011 | Durney | B21D 35/00 | 428/596 |
| 2013/0000246 | A1 * | 1/2013 | Bourelle | E04F 21/162 | 52/749.1 |
| 2016/0177580 | A1 * | 6/2016 | Milane | E04F 21/162 | 401/48 |

* cited by examiner

HANDLE ATTACHMENT FOR AN ADHESIVE SPREADER

CROSS-REFERENCE TO RELATED APPLICATION

This Application is a Section 371 National Stage Application of International Application No. PCT/AU2021/000010, filed 5 Feb. 2021, and published as WO 2021/155424 A1, on 12 Aug. 2021, in English, the contents of which are hereby incorporated by reference in their entirety.

FIELD OF DISCLOSURE

The field of disclosure of this document is adhesive spreading as done in preparation for laying tiles.

BACKGROUND

The laying of tiles is an ancient skill, and various skills are involved. Those skills include but are not limited by the following list: the preparation of the surface/s to be tiled which can be horizontal and vertical and at angles there between; the measuring and cutting of tiles to size and shape to suit the prepared area and to lie next to various objects such as drains, pipes, furniture, and other fixtures; preparation of the appropriate quantity of tile adhesive having the appropriate consistency and ideal setting time; spreading the adhesive well within the setting time over the prepared area sufficient for the appropriate number of tiles; laying the tiles at the appropriate height and sometimes slope (to allow for water run-off in a preferred direction or towards a required location); separating the tiles by a consistent size and shape, and mixing grout to the appropriate colour, consistency and setting characteristic; spreading and filling the grout within the spaces between tiles, and finishing off the tiles by cleaning and applying sealant when required to achieve a smooth and typically water-sealed interface between the tiled area and the supporting wall or surface.

Training and long periods of performing and honing those skills provide the basis for a competent tradesperson to become an expert tiler.

Surprisingly, there have been only a few advances in tools to assist the tiling tradesperson, one example being the tool used to cut a tile. Another example is the advances in the formulation of adhesives to make them easier to mix, easier to spread, and more adhesive to tiles and surfaces over more extreme environmental conditions.

Despite the long list of skills, tiling is not beyond a person that has a Do-It-Yourself attitude and the drive to give this task a go, assisted by the availability of tools and advanced formulations of adhesive, in some cases pre-mixed and ready to use once the packaging is opened.

At the same time tiles have become both smaller and substantially larger. For small tiles, an array of pre-arranged tiles formed on a mesh sheet provides consistency of spacing and pattern and is a great time saver, since mat after mat can be laid even though the tile pattern is intricate. For large tiles, tiles of 300 mm by 300 mm were considered large, but now 600 mm by 600 mm and even 1000 mm by 1000 mm sized tiles are in vogue.

With the need to prepare for and lay many sheets of small tiles and large tiles accompanying the concurrent need to spread more adhesive more quickly than smaller tiles would require, while also ensuring even distribution of the adhesive over the area in preparation for the laying of the sheet of tiles or individual tiles. There is also the need to physically lift and lay the larger format tile/s before the adhesive sets or becomes harder than desirable to permit the tile to settle to the required depth or slope.

Thus there is a need for tools that assist both skilled and non-skilled persons to perform the steps involved in preparing for the laying of tiles of all sizes.

BRIEF DESCRIPTION OF ASPECTS OF THE DISCLOSURE

This Summary is provided to introduce a selection of concepts in a simplified form that is further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following written Detailed Description, including those aspects illustrated in the accompanying drawings and defined in the appended claims.

In an aspect an adhesive spreader tool for spreading tile adhesive over a floor surface in preparation for the laying of a tile. The adhesive spreader tool comprises: two substantially rectangular planar sheets of deformable material having at least a first and a second edge being parallel and opposed to each other, both sheets having castellations along a first portion of the first edge wherein the castellation occupies a greater portion of the length of the first side than the remaining portion of the first side of the planar sheet; each substantially rectangular planar sheet having at least one longitudinal slot therein, the longitudinal slot orientated at a right angle to both the parallel and opposed first and second edges and spaced along on each sheet about half-the-width of a castellation from the last full castellation along the first edge; and at least one sheet joiner element, wherein in use, each sheet is folded along the respective at least one slot to form a folded portion of the substantially rectangular planar sheet orientated at right angles to the portion of the substantially rectangular planar sheet having castellations, and once first and second edges of each substantially rectangular planar sheet are aligned with each other, and the two sheets are joined using the at least one joiner element, the joined substantially rectangular planar sheets form a continuous array of castellations along the respective first sides of the joined substantially rectangular planar sheets and end walls formed by the folded portions of the joined substantially rectangular planar sheets, wherein the joined sheets and folded substantially rectangular planar sheets form an adhesive spreader tool adapted for positioning on a floor surface and for spreading over the floor surface tile adhesive placed between the end walls.

In an aspect, there are an array of apertures located intermediate the castellated edge and the second edge opposite the first edge and the at least one joiner element is located through at least a pair of aligned apertures, thereby fixing the two substantially rectangular planar sheets together and maintain a spacing between the end walls formed by the folded portions of the joined substantially rectangular planar sheets to substantially match the width of the tile yet to be laid.

In an aspect there is an adaptor for attachment to a handle, the adaptor for use with an adhesive spreader tool for spreading adhesive over a floor surface. The adhesive spreader tool having at least a longitudinal castellated surface abutting edge and an upper longitudinal edge opposite the longitudinal castellated edge of a planar body between two ends of the adhesive spreader tool and the body between the two ends having front and rear planar surfaces, with the adaptor also having side barriers forwardly extending at right angles to the planar body for retaining adhesive between the side barriers located at the two ends of the adhesive spreader tool. The adaptor comprising: a longitudinal body comprising a first longitudinal barrier defining a hollow capture volume and a leading edge portion of the barrier forming one side of an entrance to the hollow capture volume, the longitudinal barrier extending between first and second ends of the longitudinal barrier and having open first and second ends; at least two longitudinal wall structures spaced to form one or more longitudinal channels extending between a first and a second end of the longitudinal wall structures wherein the channel or channels are open at each end and at least a portion of one of the longitudinal wall structures forms an abutment surface; a first longitudinal support member adapted to be longitudinally slidable within a first channel of the one or more channels, so that a portion of the first longitudinal support member is external of the open end of the first channel; a second longitudinal support member adapted to be longitudinally slidable within the first channel or a second channel of the one or more channels, so that a portion of the second longitudinal support member is external of the open end of the respective channel, wherein the external portions of the longitudinal support members longitudinally extend substantially parallel to the longitudinal body, and the longitudinal support members slide past each other while within their respective channel.

In an aspect there is a handle engagement fixture fixed to the body; wherein in use, the handle is engaged with the handle engagement fixture, and the upper longitudinal edge opposite the longitudinal castellated edge of the adhesive spreader tool is located in the hollow capture volume so that the leading edge portion of the barrier abuts against the front planar surface of the adhesive spreader tool and the rear wall of the adhesive spreader abuts the abutment surface of at least one of the further longitudinal wall structures, so that when a user of the tool pulls the handle, the planar front and rear walls of the adhesive spreader tool are maintained substantially vertical with respect to the floor surface and the handle is orientated at an acute angle to the planar floor surface.

In an aspect there is a method of spreading adhesive over a floor surface using an adaptor as disclosed in an aspect engaged with a handle and adhesive spreader tool as disclosed in an aspect in preparation for a tile to be laid. The method comprising the steps: adjusting the first and second longitudinal supports to the width of the tile to be laid; abutting the longitudinal castellated surface abutting edge of the adhesive spreader tool with a floor surface; placing adhesive between side barriers of the adhesive spreader tool; and dragging the adaptor and adhesive spreader tool while maintaining the longitudinal castellated surface abutting edge of the adhesive spreader tool in sliding abutment with the floor surface across a surface of the floor to be tiled to allow the adhesive to seep between the castellations and leave a bed of castellated adhesive over a portion of the surface of the floor.

In the following discussion, certain articles and methods will be described for background and introductory purposes. Nothing contained herein is to be construed as an "admission" of the prior art. Applicant expressly reserves the right to demonstrate, where appropriate, that the articles and methods referenced herein do not constitute prior art under the applicable statutory provisions.

The reference to any prior art in this specification is not, and is not to be taken as, an acknowledgement of any form of suggestion that such prior art forms part of the common general knowledge.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

It will be appreciated that various modifications can be made without departing from the principles disclosed. Therefore, the embodiments should be understood to include all such modifications within their scope.

The prior summary of aspects is provided to introduce a selection of concepts in a simplified form described below in the Detailed Description of Embodiments. That summary is not intended to identify key features or essential features of the claimed subject matter.

DETAILED DESCRIPTION OF EMBODIMENTS

As used in the specification and claims, the singular form "a", "an" and "the" and include plural references unless the context dictates otherwise.

The present disclosure may use the term "comprise" (open-ended) or "consist essentially of" the components of the present disclosure as well as other methods or elements described herein. As used herein, "comprising" means the elements recited, or their equivalent in structure or function, plus any other element or elements which are not recited. The terms "having" and "including" are also to be construed as open-ended unless the context suggests otherwise. As may be used herein, "consisting essentially of" means that the claimed arrangement, method and system may include elements in addition to those recited in the claim, but only if the additional elements do not materially alter the novel characteristics as claimed.

Where used herein, the term "and/or" when used in a list of two or more items means that any one of the listed characteristics can be present, or any combination of two or more of the listed characteristics can be present. For example, if a step is described as containing characteristics A, B, and/or C, the step can contain A feature alone; B alone; C alone; A and B in combination; A and C in combination; B and C in combination; or A, B, and C in combination.

Figure 1:
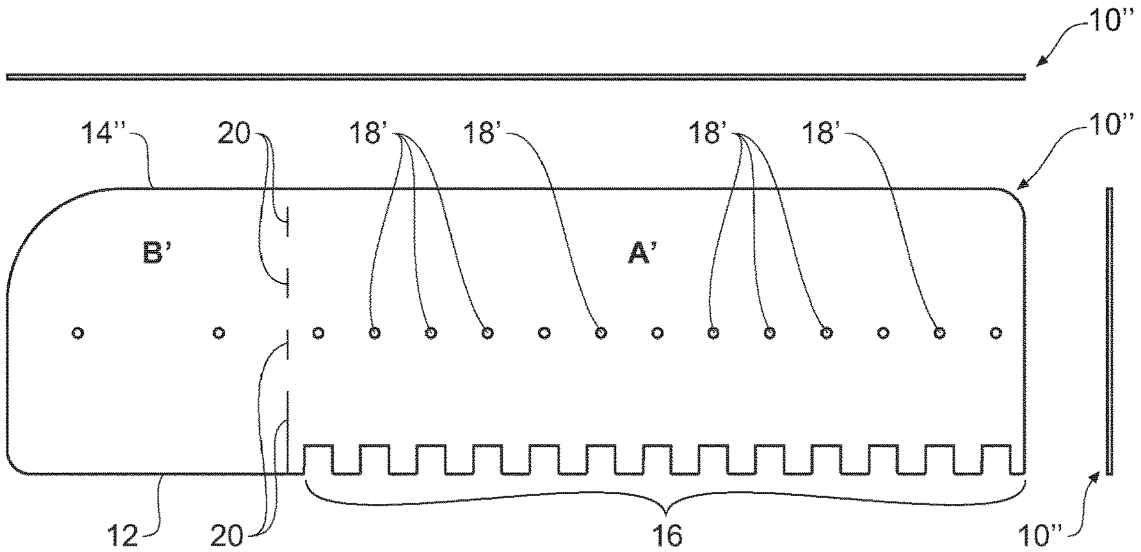
FIG. 1 depicts a top, side and front view of one part of an embodiment of an adhesive spreader tool.
Figure 2:
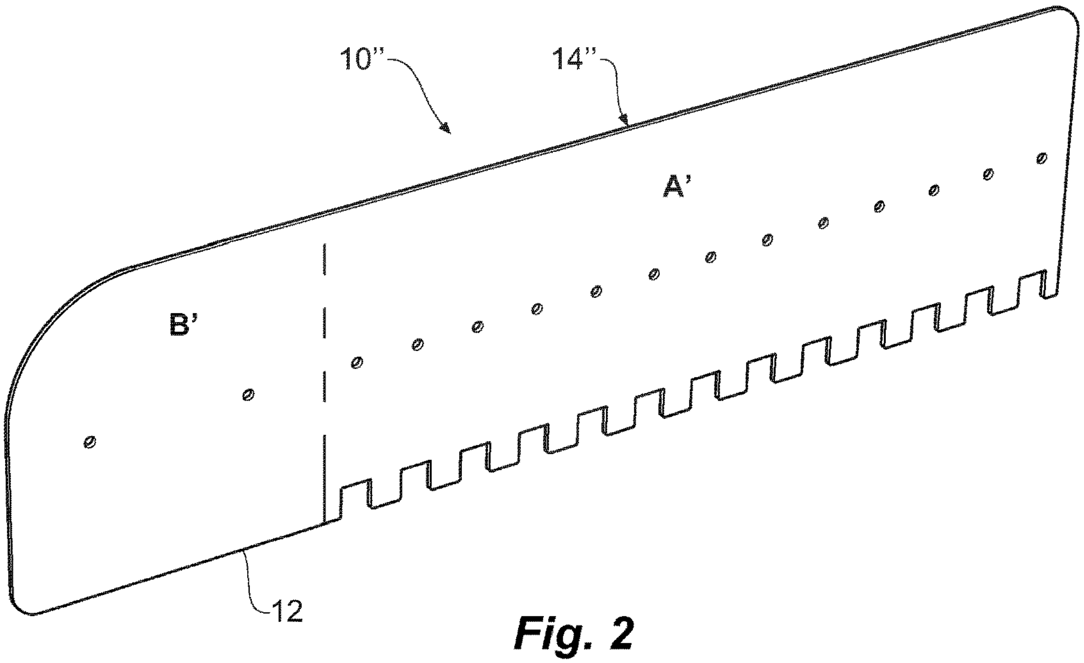
FIG. 2 depicts a perspective view of the embodiment of an adhesive spreader tool as depicted in FIG. 1.

FIGS. 1 and 2 depict a top, side, front and perspective view of one part of an embodiment of an adhesive spreader tool 10. The substantially rectangular planar sheet has at least first and second edge regions 12 and 14 respectively being parallel and opposed to each other. The sheet has the first edge 12 partially castellated 16 along the first portion of edge 12 wherein the castellation occupies a greater portion of the length of the first side than the remaining portion of the first side of the planar sheet. The planar sheet is preferably metal, preferably of light sheet steel and may be anodised or galvanised. The adhesive spreader will be in contact with flowable adhesive and the composition of different adhesives may be corrosive, hence it is preferable that the material of the planar sheet is resistant to some degree to corrosion.

The cut-out shape depicted in all the Figures depicting the adhesive spreader can be the result of a laser cut out of the planar sheet material, but could also be stamped, or depending on the material, formed at the time of creation by moulding. The particular castellation shapes 16' and 16" depicted along a portion of the bottom edge of the assembled adhesive spreader 10, preferably have dimensions of 12 mm by 12 mm (width by depth) which is chosen by the developer of the adhesive spreader tool 10 to best distribute tile adhesive to allow for a useful spreading of the adhesive in preparation of the laying of a tile on the spread adhesive. One reason for choosing those dimensions is they create a compressed bed of adhesive of 3 mm which is the same as the compressed bed created by using a 15 mm×15 mm notched trowel (castellated shape), because the notched trowel is used at a 45 degree angle whereas the adhesive spreader tool is used in the almost vertical orientation. Another embodiment uses castellation shapes 16' and 16" having dimensions of 15 mm by 15 mm (width by depth). The user of the adhesive spreader tool can best determine the form of the final adhesive spread according to the angle of the adhesive spreader tool to the surface on which the adhesive is being spread.

The preparation steps including the application of adhesive to the floor or sometimes wall surface are as described. However, it is also a practice for some tilers to apply adhesive to the rear of the tile, known as 'back buttering' or 'back purging' and referred to herein as back buttering, prior to laying the tile onto the adhesive distributed over the floor or wall surface. The act of back buttering typically involves the application of a thin layer of adhesive on the back surface of the tile to be laid and that coating of adhesive can perform a number of functions: by promoting increased bond strength of the adhesive by the chemical action of the adhesive over most of the rear surface; the applied adhesive partially or fully filling voids typically part of the shape of the rear of a tile; and thus improving the likelihood of appropriate adhesion of the tile once laid. Some tilers do not perform back buttering as they are skilled at creating an appropriate density and curing time of the adhesive, and the trowel they choose to use provides an appropriate height for the rows of adhesive, as well as an appropriate width of the troughs substantially absent of adhesive between the rows of adhesive is an integral and repeatable part of their preferred tiling process. There are some types of tiles which are advantageously back buttered such as for example natural stone tiles.

American National Standards Institute ANSI A108.5 section 2.5.3 states: "Average uniform contact area shall be not less than 80% except on exterior or shower installation where contact area shall be 95% when not less than three tiles or tile assemblies are removed for inspection. The 80% or 95% coverage shall be sufficiently distributed to give full support of the tile with particular attention to this support under all corners of the tile." This excerpt of the ANSI standard is provided as an example only since practices and standards vary from country to country and in some jurisdictions the known standards are not mandatory and merely advisory. The adhesive distribution provided in this excerpt is merely an example of the detail of a preferred adhesive spread on the underside of a laid tile, recognising that tiling is a very practical profession and appropriate expertise is gained over considerable time and is not a theoretical exercise.

The shape of the castellation may be formed by one side wall; such as a half circle or curved, or another single walled shape; or formed by two side walls, such as to have a triangular shape; or the shape may be formed by three side walls and so could be a half hexagonal shape, and other quantities of side walls and respective shapes are possible, as long as they are adequate for the purpose of distributing adhesive on the floor surface in a manner suited to receive a tile for fixing to the floor with the adhesive. The height of the spread adhesive is set by the greatest depth dimension of each castellation. That height is selected to be suitable for allowing some settling of the tile onto the spread adhesive and to allow the height of the tile above the planar floor surface once adequately bedded on to the adhesive to be set by the tiler. The height of the spread adhesive also allows the tiler to adjust the slope of the tile in chosen areas of the floor, such as towards a water-trap or water-drain or to one side of the area being tiled.

The embodiment of a part of an adhesive spreader tool depicted in the FIGS. 1 and 2 also depicts an array of circles 18 which are used to illustrate apertures in the sheet metal. One or more of the apertures can be used, as will be described in greater detail, to connect two such parts together although the apertures are not the only element capable of being used to join the sheets together to create an adhesive spreader.

Yet further, in an embodiment, each sheet has at least one slot 20 orientated at a right angle to both the parallel and opposed first and second edges and spaced along on each sheet about half-the-width of a castellation from the last full castellation along the first edge 12. The slot as will be described, is used to allow the bending of the substantially planar sheet along the line defined by the at least one slot so that each sheet is folded along the respective at least one slot to form a folded portion of the substantially rectangular planar sheet orientated at right angles to the portion of the substantially rectangular planar sheet having castellations.

Figure 3:
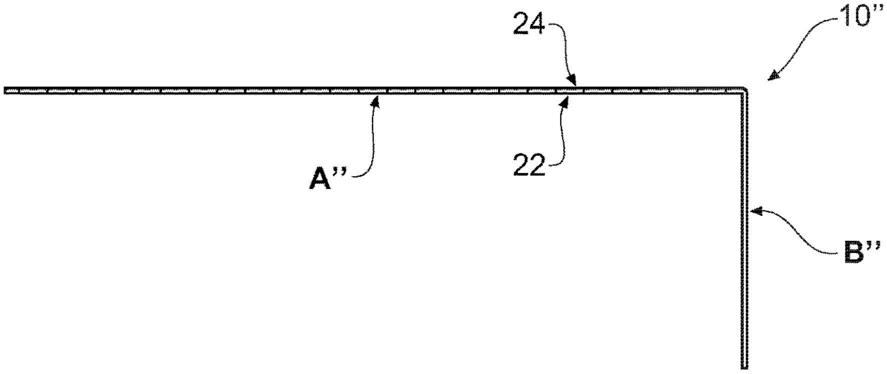
FIG. 3 depicts a bottom view of the embodiment of an adhesive spreader tool as depicted in FIG. 1 in a folded configuration.
Figure 4:
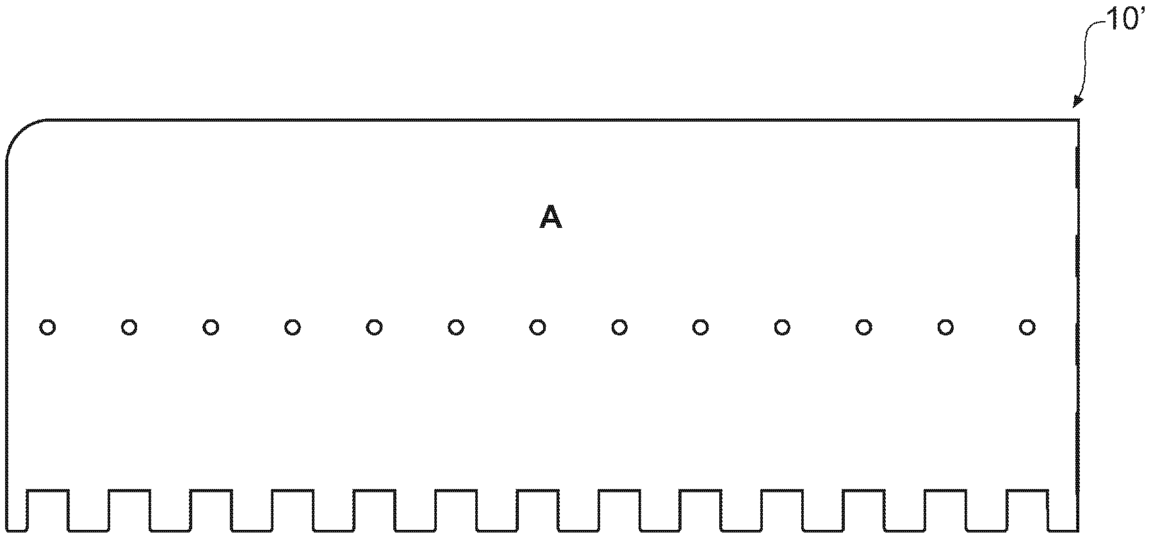
FIG. 4 depicts a rear view of the embodiment of an adhesive spreader tool as depicted in FIG. 1 in a folded configuration.
Figure 5:
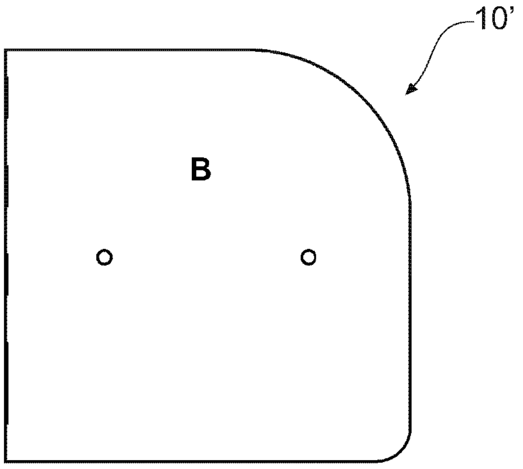
FIG. 5 depicts a side view of the embodiment of an adhesive spreader tool as depicted in FIG. 1 in a folded configuration.
Figure 6:
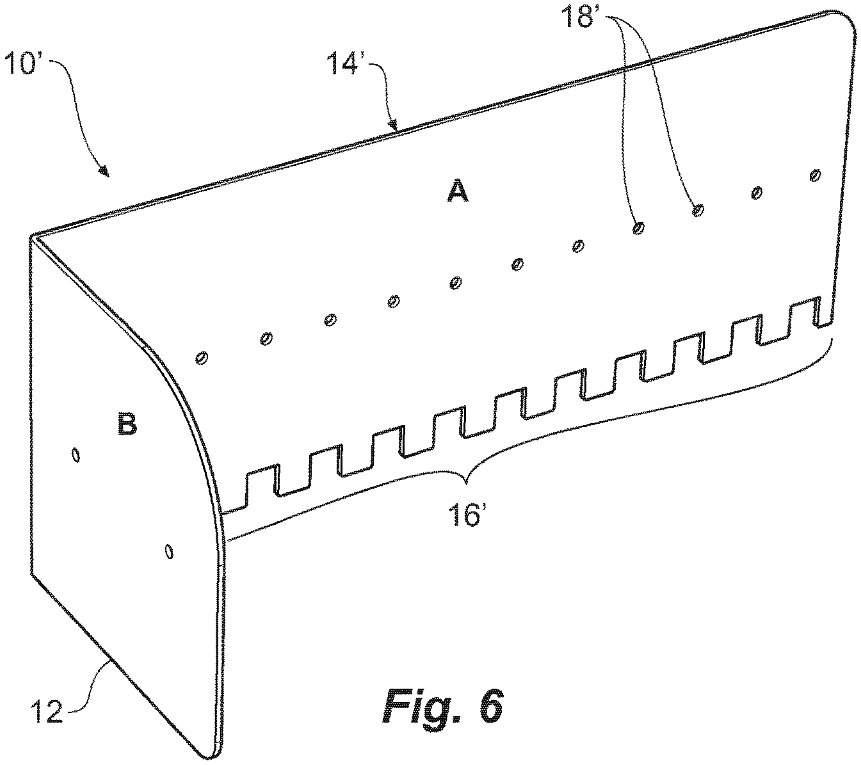
FIG. 6 depicts a perspective view of the embodiment of an adhesive spreader tool as depicted in FIG. 1 in a folded configuration.

The slot is preferably a stitch cut which makes it an easy and reliable line along which to bend portion A and portion B of the substantially planar sheet to form a right angle as depicted in FIGS. 3, 4, 5. 6 and 7. The material of the planar sheets is preferably light gauge metal, but could be made of other material, such as for example, a suitable strength ABS plastic (suitably UV stabilised) which is also suitable for bending and then maintaining the bent shape. Otherwise, an additional fixing arrangement such as a brace could be used to maintain the right angle while resisting forces to unfold or those forces which result during use of the adhesive spreader.

FIGS. 3 to 8 respectively depict a bottom, rear, side, perspective, top and front view of the embodiment of an adhesive spreader tool 10 as depicted in FIG. 1 in a folded configuration, wherein in use, each sheet is folded along the at least one slot 20 to form a portion of the sheet being portion B at right angles to the portion of the sheet being portion A where in this embodiment there are no castellations. Like figures denote like features in FIGS. 1 to 8.

Figure 7:
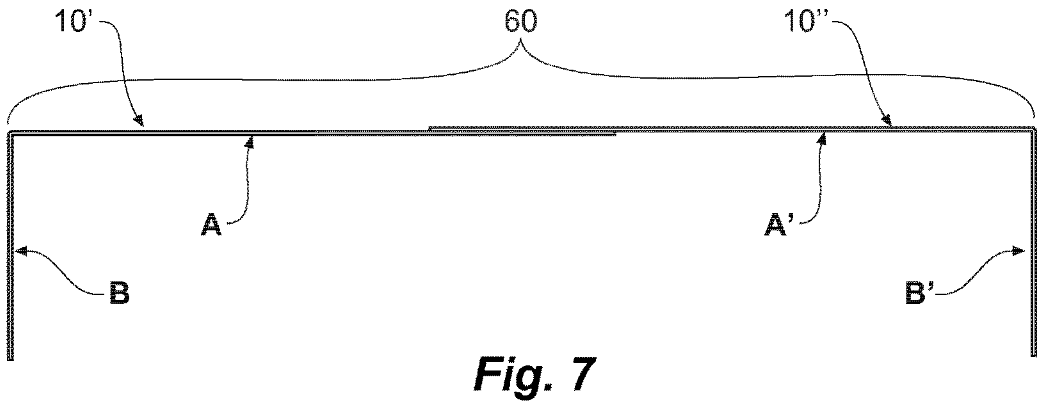
FIG. 7 depicts a top view of the embodiment of an adhesive spreader tool as depicted in FIG. 1 connected to another of adhesive spreader tool as depicted in FIG. 1 both in a folded configuration.
Figure 8:
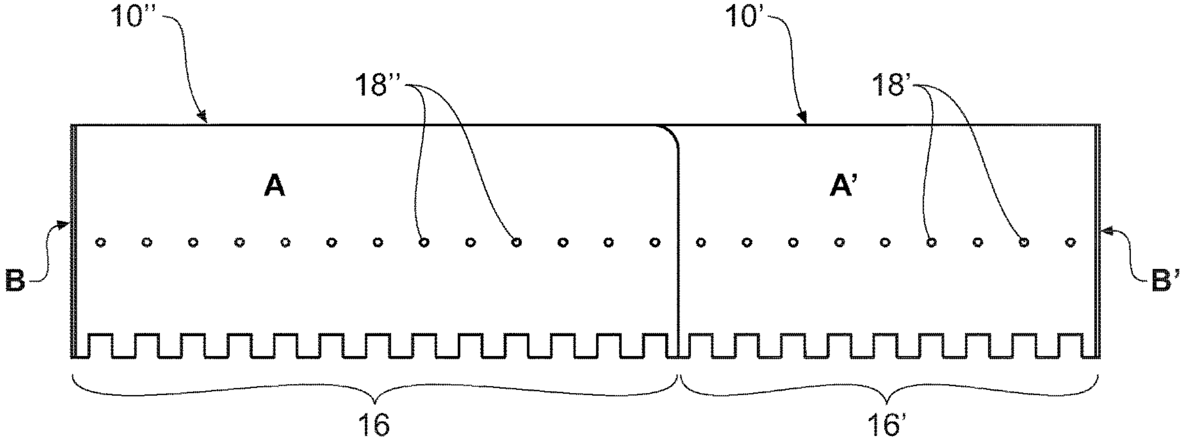
FIG. 8 depicts a front view of the embodiment of an adhesive spreader tool as depicted in FIG. 1 connected to another of the adhesive spreader tool as depicted in FIG. 1 both in a folded configuration.
Figure 9:
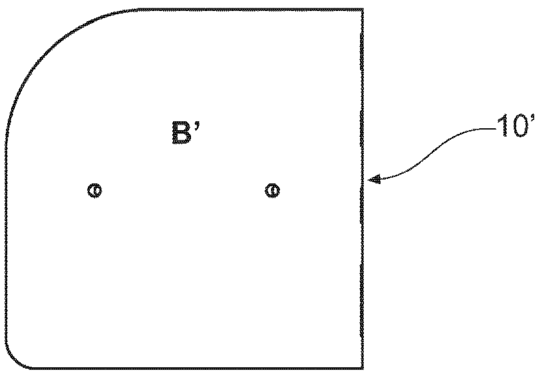
FIG. 9 depicts a side view of the embodiment of an adhesive spreader tool as depicted in FIG. 1 connected (but not shown) to another of the adhesive spreader tool as depicted in FIG. 1 both in a folded configuration.

FIG. 7 depicts a top view of the embodiment of an adhesive spreader tool 10 as depicted in FIG. 3 comprising a part 10' connected to another of the adhesive spreader tool part 10" as depicted in FIG. 3, both being in a folded configuration. This embodiment of an adhesive spreader tool is comprised of two identical parts 10' and 10". The two identical parts in their unfolded condition provide for ease of packaging since they are shaped planar sheets of suitable material. This flat pack embodiment of the two parts (both the same in shape and size) can be very advantageous as it allows for ease of manufacturing and advantageously the cost of packaging and transportation to be as small as possible, especially when the adhesive spreader tool may not have a large margin for wholesale, and retail sale purposes. As depicted in FIG. 10B a spreader tool part 10'" has castellations, in use, bottom edge (first edge) along its full width, and an array of apertures 18'" for alignment purposes to those apertures 18' and 18" in the other parts of a spreader tool. The spreader tool part 10'" is useable to be fixed in between adhesive spreader tool part 10' and adhesive spreader tool part 10" to further extend the overall length of the adhesive spreader tool when used in conjunction with longitudinal support members and the adaptor.

FIGS. 7, 8, 9 and 10 depict top, front, side and perspective views respectively of the connected/assembled adhesive spreader tool 10 formed by identical parts 10' and 10" (unfolded/folded). As previously described herein, each substantially rectangular planar sheet is folded along the at least one slot 20 to form a portion of the sheet without castellation (B and B' of respective sheets) at right angles to the portion of the sheet (A and A' of respective sheets) which do have castellation. When first edges 12' and 12" and second edges 14' and 14" of each sheet 10' and 10" (as depicted in FIGS. 7 to 10) are longitudinally aligned, and the two sheets are joined using at least one joiner element (not depicted) located through two aligned apertures 18 and 18', the joined sheets form a long continuous array of castellations 16' and 16" along the respective first sides of the joined sheets. End walls B and B' are formed by the folded portions of the joined sheets, wherein the joined and folded sheets form an assembled adhesive spreader tool adapted for positioning on a floor surface and for spreading over the floor surface adhesive placed between the end walls.

The array of apertures 18 are located intermediate the castellated edge 12 and the second edge 14 opposite the first edge and at least one joiner element is located through at least a pair of aligned apertures 18 and 18' to join the two sheets together to provide a spacing between the end walls B and B' formed by the folded portions of the joined sheets that spacing to substantially match the width of the tile to be laid. Thus, for tiles of 300 mm width (or at least the width along which the adhesive is to be spread) the distance between side B and B' is 300 mm. For tiles, 600 mm, the distance between side B and B' is 600 mm and so on for each tile type being laid.

Hence the distribution of the apertures 18 is such that all tile widths in commercial use can be accommodated when setting the width between the sides B and B'. The apertures do not have to be used since the two folded sheets can be connected by at least one sheet joiner element, such as for example, at least one clamp but preferably two clamps, which acts to join the two sheets together. Another at least one sheet joiner element could be an adhesive suitable to keep the two sheets together for the period of the task at hand. A yet further example of at least one sheet joiner element could be double-sided tape which can be placed on one sheet to then adhere to the planar side of the other sheet.

The sheet joiner element for connecting the parts 10' and 10" can in one embodiment be a pin of material such as plastic which deforms as it is placed through aligned apertures and elastically expands to firmly engage the internal wall of each aperture and thus when parts 10' and 10" are positioned planar face to planar face. An example of a plastic snap rivet and an example of a nylon lock pin are both depicted in FIG. 10A. The joiner element would need to be suitably sized (width and length) to ensure the firm connection of part 10' to 10". In another embodiment, the joiner element may be as simple as a wire threaded through two or more aligned apertures and its free ends twisted together to connect the parts abutting each other and connected firmly enough to be used as intended.

Figure 10:
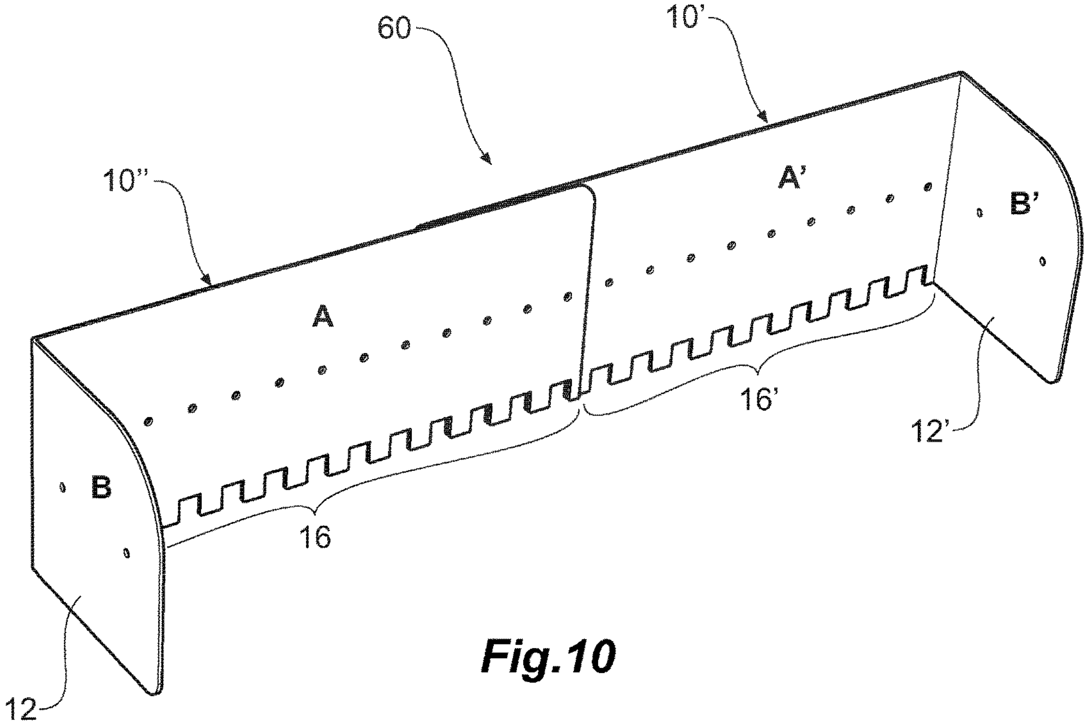
FIG. 10 depicts a perspective view of the embodiment of an adhesive spreader tool as depicted in FIG. 1 connected to another of the adhesive spreader tool as depicted in FIG. 1 both in a folded configuration.
Figure 10A:
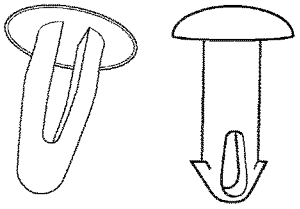
FIG. 10A depicts two embodiments of joiner elements.
Figure 10B:
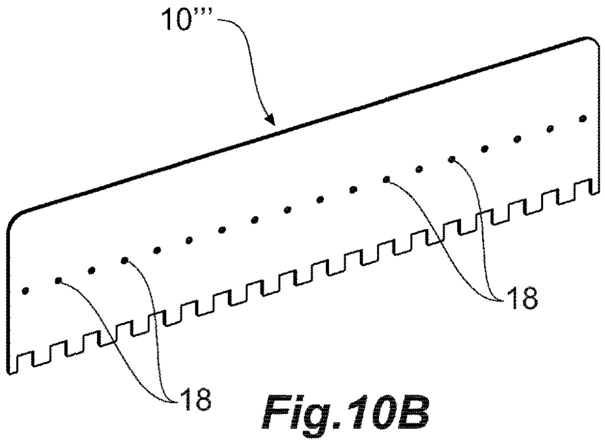
FIG. 10B depicts a spreader tool part which has castellations along the first edge and an array of apertures.
Figure 11:
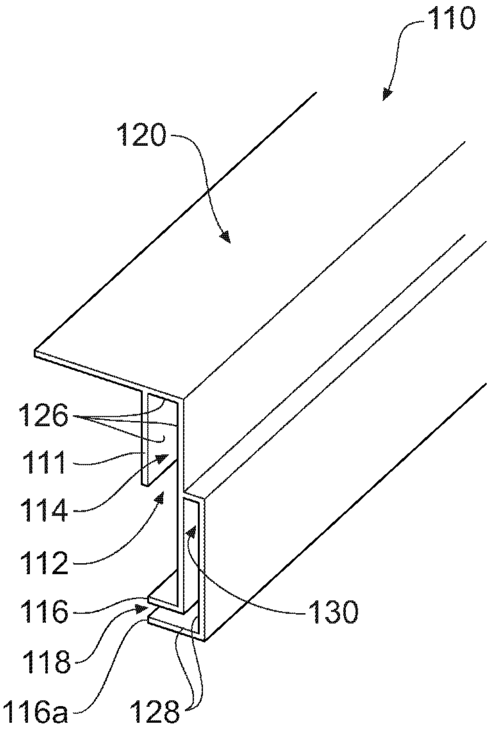
FIG. 11 depicts a side perspective view of the end of an embodiment of an adaptor for attachment to a handle for use with an embodiment of an adhesive spreader tool as disclosed herein.

FIG. 11 depicts a side perspective view of an embodiment of an adaptor 110 for attachment to a handle (not shown) for use with an embodiment of an assembled adhesive spreader tool (10', 10") as disclosed herein and an embodiment depicted in FIG. 10. The profile disclosed in FIG. 11 is but one example profile since it is the function of the various parts of the adaptor that when working together with the adhesive spreader to perform the function spreading adhesive over a floor surface. The adhesive spreader tool having, in a broad form, at least a longitudinal castellated surface abutting edge and an upper longitudinal edge opposite the longitudinal castellated edge of a planar body between two ends of the adhesive spreader tool and the body between the two ends having front and rear planar surfaces. The adhesive spreader tool also having side barriers forwardly extending at right angles to the planar body for retaining adhesive between the side barriers located at the two ends of the adhesive spreader tool.

Figure 11A:
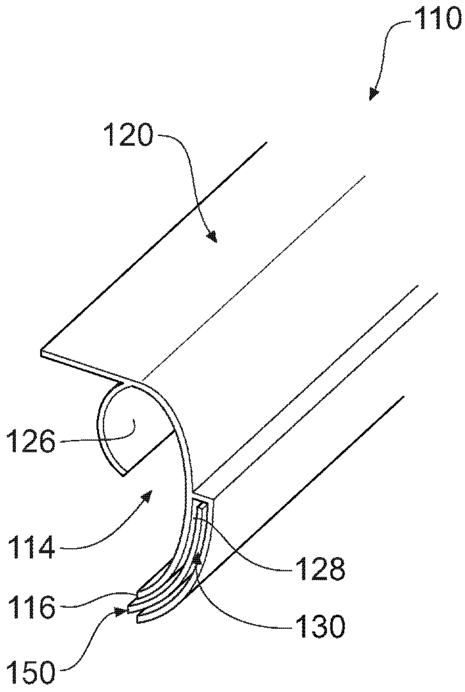
FIG. 11A depicts a line drawing of a side perspective view of the end of a further embodiment of an adaptor for attachment to a handle for use with an embodiment of an adhesive spreader tool as disclosed herein.

Referring to FIG. 10, the adhesive spreader tool has a first castellated edge (16',16"), a second upper edge (14, 14') opposite the first castellated edge and a planar rear surface 60, which when the adaptor is fitted over the edges 12 and 12' of the assembled tool 10, the downwardly facing aperture 112 of the hollow capture volume 114, formed by a first longitudinal barrier 111 which provides at least one wall defining a hollow capture volume 114 as depicted in FIG. 11 and FIG. 11A and the longitudinal barrier 111 having a leading edge 113. The hollow capture volume is slid over the second upper edge (14' and 14") of the substantially planar adhesive spreader tool 10, so that the leading edge 113 of longitudinal barrier 111 is located against the front surface 22 and the leading edge 116 of the longitudinal barrier 118 is located against the rear surface 24 of the adhesive spreader tool 10 and the second upper edge of the substantially planar adhesive spreader tool is located against the inside surface of the wall/s of the hollow capture volume 114, so that the when the handle is pulled by a user 142 (see FIG. 14 and user 142) of the assembled adhesive spreader tool, the adhesive spreader tool is maintained substantially vertical with respect to the floor surface and the handle is orientated at an acute angle Ø (see FIG. 15) to the plane of the floor surface. The angle Ø is not explicitly defined but in terms of the use of the adaptor and adhesive spreader tool the angle is likely between 15 and 45 degrees, this being set by the adaptor and the method of use, which may vary slightly from user to user.

By way of example a method for spreading adhesive over a floor surface using an adaptor disclosed herein engaged with a handle and adhesive spreader tool as disclosed herein in preparation for a tile to be laid comprising the steps, as follows: adjusting the first and second longitudinal supports to the width of the tile to be laid; abutting the longitudinal castellated surface abutting edge of the adhesive spreader tool with a floor surface; placing adhesive between side barriers of the adhesive spreader tool; and dragging the adaptor and adhesive spreader tool while maintaining the longitudinal castellated surface abutting edge of the adhesive spreader tool in sliding abutment with the floor surface across a surface of the floor to be tiled to allow the adhesive to seep between the castellations and leave a bed of castellated adhesive over a portion of the surface of the floor. The method could be changed by the step of abutting performed first and the step of adjusting performed second. The adhesive quantity to be placed between the side barriers will depend on the to be laid tile's width and the length dimensions of the side barriers. The pace of the dragging action will be determined in part by the density and flow characteristics of the adhesive and the result of the formation of castellated adhesive distributed over the floor surface. The expertise of the user in making up the adhesive mix will allow them to control those flow characteristics, the density and the rate of curing of the adhesive mixture to be used.

The leading edges (116, 116*a* by way of example and depicted in FIG. 11A) of all the further longitudinal wall structures is useable as described above. It is possible to create the same functional outcome of a leading edge by using the leading edge 116*a* as is depicted in FIGS. 11 and 11A, and not have longitudinal barrier 118, or its incorporated leading edge 116 shown in FIG. 11 forming an abutment surface of at least one of the further longitudinal wall structures. In another embodiment, the leading edge 116*a* would perform the same function. The first and second longitudinal support members 150 and 152 effectively extend the leading edges 113 and 116 and 116*a* to maintain the adhesive spreader 10 at a useable angle to the floor surface. Such is the case even if in some situations the first and second longitudinal support members do not extend the full width of the assembled adhesive spreader. The inherent stiffness of the assembled adhesive spreader should not need support when the majority of its width is supported and guided by the adaptor with the non-extended or extended longitudinal support member/s. It is possible to fix the adaptor to extension members to further stiffen the extended extension members. Apertures are provided in the adaptor and in the extension members to accommodate fixing arrangement to fix the adaptor and/or the extension members to the spreader once the width of the tile is used to determine the required adjustment of the spreader and the supporting extension members.

FIG. 11 depicts an end view of the profile of a continuous length of a predetermined length of an adaptor 110, which can be about 300 mm long. In the depicted end view, is an arrangement of right angle joins between vertical and horizontal walls. The required profile can be extruded, for example, when using aluminium. The accuracy of such an extrusion can be closely controlled to result in minimal dimensional variation over the length of the profile of not only the adaptor but also the longitudinal support members and the adhesive spreader parts. The described method of manufacture has low cost especially once the die costs have been recouped since the material cost is minimal, as is the cost of cutting and packaging the required length of the body. However, the function of the various volumes and edges needed to perform as described herein can also be created using multiple angled or curved rather than flat surfaces. In another embodiment, the profile will look very different. An example shape in FIG. 11 or FIG. 11A that FIG. 11A depicts curved surfaces forming the hollow capture volume 114 and in FIG. 11 depicts angled surfaces forming two hollow capture volumes.

FIG. 11 depicts a longitudinal body 120 having at least a first end 122*a* and a second end (not shown in FIG. 11) but depicted in FIG. 122*b*. The body comprises at least one wall 126 (being three walls in FIG. 11, but only one wall is depicted in FIG. 11A) which more broadly can be described as first longitudinal barrier defining a hollow capture volume 114 defined by the wall/s 126, extending between the ends 122*a* and 122*b* of the longitudinal body 120 of the adhesive spreader tool 10. The hollow capture volume has in the embodiment depicted in FIG. 11, a downwardly facing aperture 112 extending between the ends of the longitudinal body.

In the embodiment depicted in FIGS. 11 and 11A, a longitudinal barrier 118 having at least one leading edge 116 forms the entrance to the downwardly facing aperture of the hollow capture volume. The leading edge could be formed using portions of a longitudinal barrier 118 since the function of the barrier or portions of a barrier is to abut the planar rear surface 60 of the adhesive spreader tool 10 during the use of the adaptor 110 with the adhesive spreader tool.

There are at least two further longitudinal wall structures spaced to form one or more longitudinal channels extending between a first and a second end of the further longitudinal wall structures wherein the channel or channels are open at each end, and at least a portion of one of the further longitudinal wall structures forms an abutment surface. In the embodiments depicted in FIGS. 11 and 11A, there is at least one further wall 128 defining a longitudinal channel

130 intermediate the ends 122*a* and 122*b* of the longitudinal body 120 and open at each end. The wall or portions of a wall could be used, since the function of the longitudinal wall or portions of such a wall or barrier is to support and encase the embodiments depicted in FIGS. 11 and 11A, first and second longitudinal support members. Both of the longitudinal support members are sized to fit side by side within the longitudinal channel 130 formed by the further wall 128 since that is where they can be stored until needed.

The dimensions shown in FIG. 11 are merely indicative and do not limit the disclosure.

Figure 15:
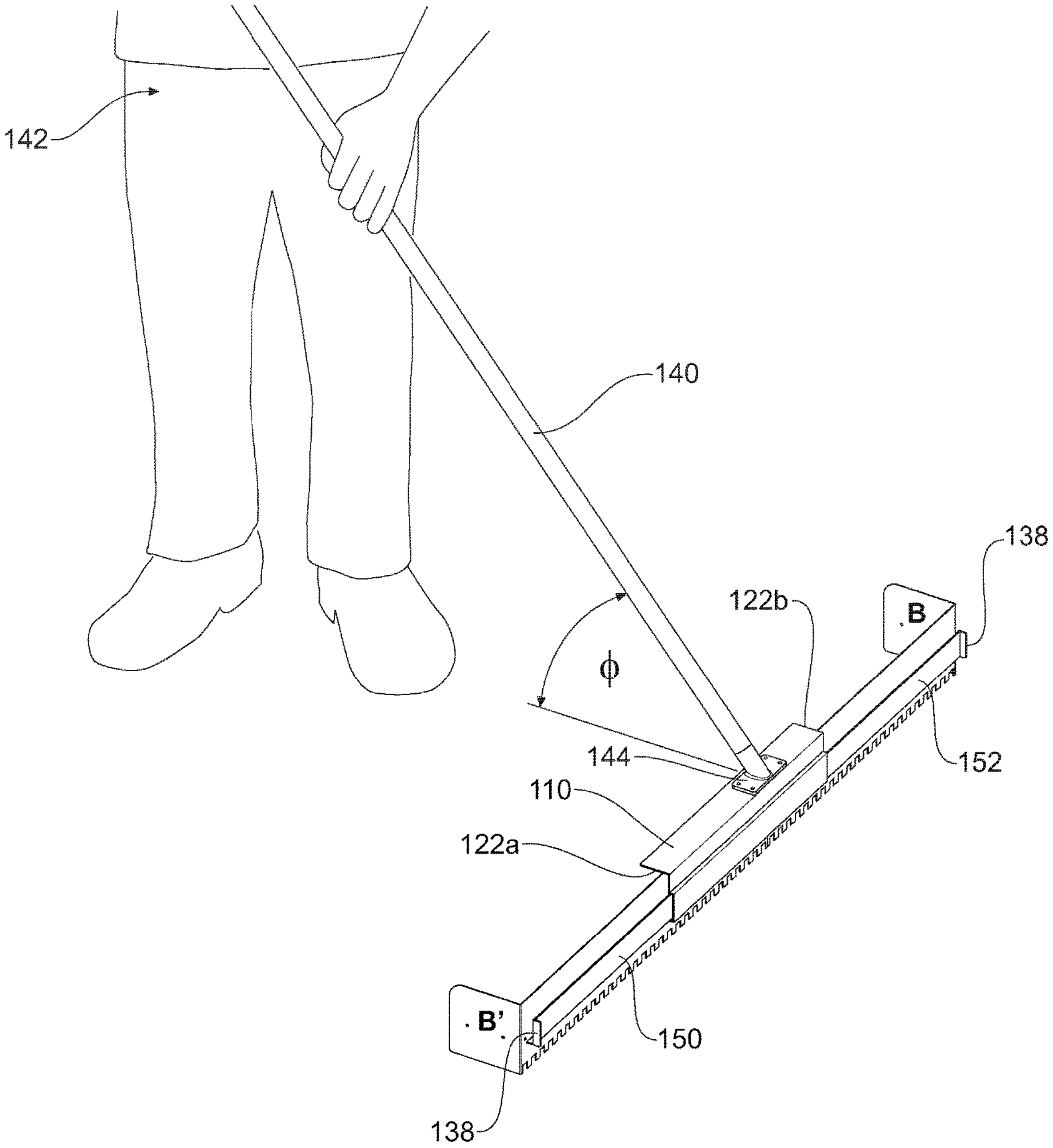
FIG. 15 depicts a handle attached to an embodiment of an adaptor having longitudinal support members extended laterally and which is depicted engaged with an embodiment of the adhesive spreader tool and in use by a user in accordance with a method as disclosed herein.

A first longitudinal support member 150 (as depicted in FIG. 15) is longitudinally slidable within the channel 130 such that a portion thereof is external of the channel and extends longitudinally beyond the first end 122*a* of the longitudinal body 120 of the adaptor 110. The sliding functionality is due to the less than interference fit of the longitudinal support member within the channel.

A second longitudinal support member 152 (as depicted in FIG. 15) is also longitudinally slidable within the channel 130 such that a portion thereof is external of the channel and extends longitudinally beyond the second end 122*b* of the longitudinal body 120 of the adaptor 110. The sliding functionality is due to the less than interference fit of the longitudinal support member within the channel. In one embodiment both longitudinal support members 150 and 152 are sized to be slidable past each other in the same channel and in another embodiment, each longitudinal support member 150 and 152 is slidable with a separate channel.

Figure 14:
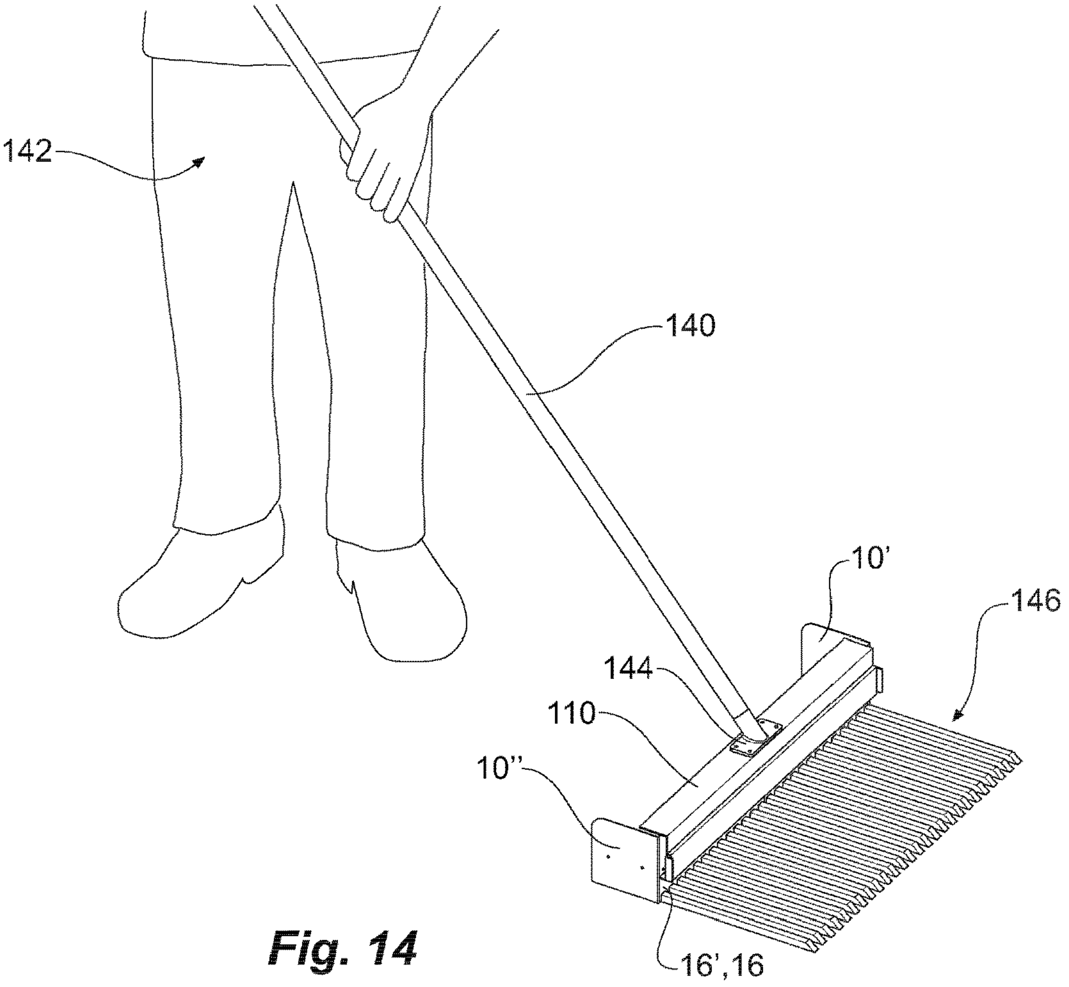
FIG. 14 depicts a handle attached to an embodiment of an adaptor which is engaged with an embodiment of the adhesive spreader tool in use by a user in accordance with a method as disclosed herein.

Thus when the external portions of the longitudinal support members 150 and 152 longitudinally extend from the longitudinal body 120 of the adaptor 110, they are extended to be substantially parallel to the longitudinal axis of the longitudinal body and to effectively extend one or both of the leading edges 116 and 116*a*. As described in general but more specifically, as depicted in FIG. 11 the longitudinal support members 150 and 152 slide past each other within the same channel and overlap within the channel and are long enough to do so even when extended to guide a wide adhesive spreader tool 10, 10'. FIG. 15 depicts a preferable embodiment of the length of the longitudinal support members 150 and 152 used to support and guide a wide adhesive spreader tool. The adaptor depicted in FIGS. 14 and 15 is the same width but the longitudinal support members have been set to suit the required tile width.

FIG. 11A depicts the same features described above similarly numbered and having the same functionality but discloses two potential leading edges 116 and 116*a*, and it would be a choice at the time of manufacture to provide one edge only to perform the function of a leading edge. The longitudinal support members 150 and 152 are longitudinally extended to be substantially parallel to the longitudinal axis of the longitudinal body and to effectively extend one or both of the leading edges 116 and 116*a*.

Figure 12:
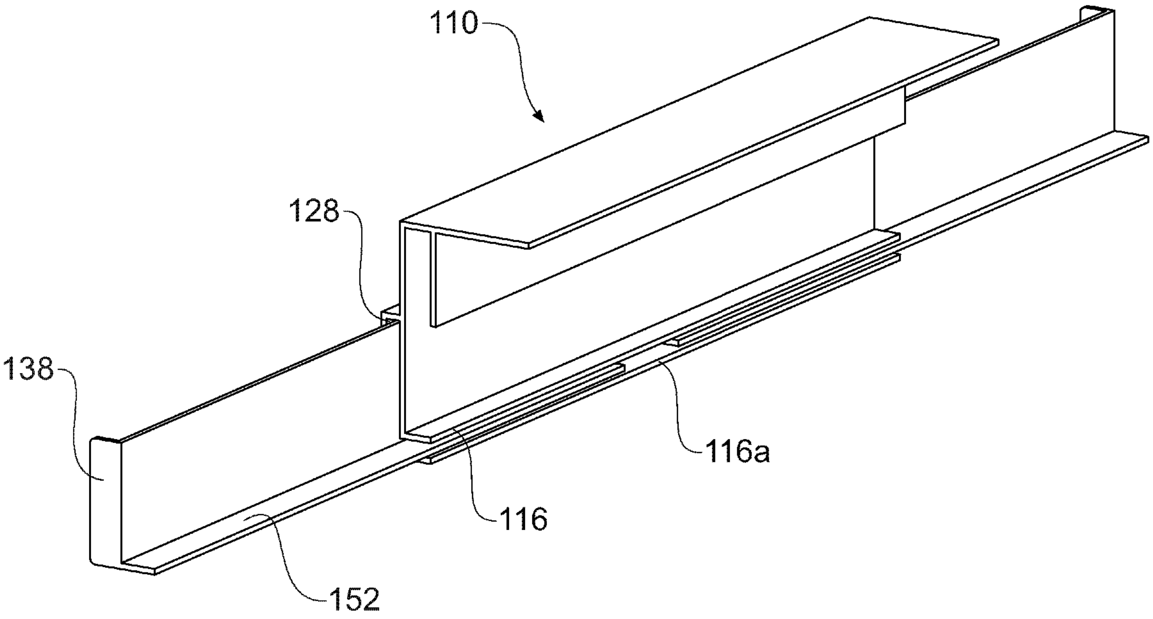
FIG. 12 depicts a vertically oblique side view of an adaptor for attachment to a handle for use with the embodiment of FIG. 11 of an adhesive spreader tool as disclosed herein.

FIG. 12 depicts a photograph of a vertically oblique side view of an adaptor 110 for attachment to a handle (not depicted) for use with an embodiment of an assembled adhesive spreader tool 110 as disclosed herein.

Figure 13:
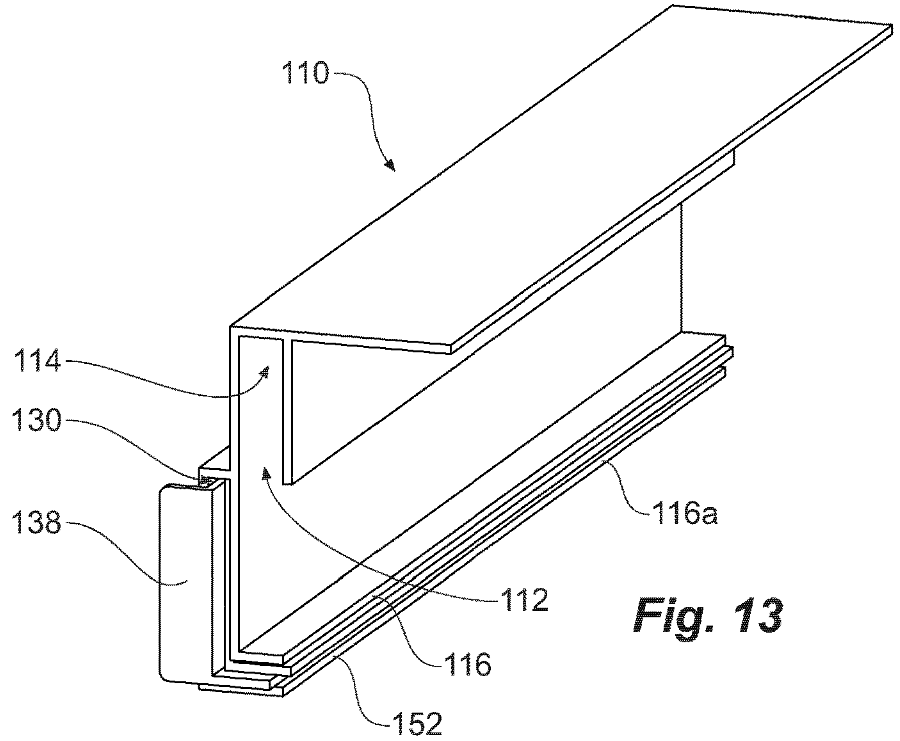
FIG. 13 depicts a laterally oblique side view of an adaptor for attachment to a handle for use with an embodiment as disclosed by FIG. 11 of an adhesive spreader tool as disclosed herein.

FIG. 13 depicts a photograph of a laterally oblique side view of an adaptor 110 for attachment to a handle (not depicted) for use with an embodiment of an adhesive spreader tool 110 as disclosed herein. In this embodiment the end stop 138 is depicted fixed to the end of the longitudinal support member 152 to restrict the longitudinal support member 152 from entering the channel 130 and make it easier for the user to adjust the position of the end of the longitudinal support member 152 along the length of an extended adhesive spreader tool 10, 10'.

FIG. 14 depicts a handle 140 attached to an embodiment of an adaptor 110 (could be any of the embodiments disclosed herein), which is engaged with an embodiment of the adhesive spreader tool 10, in use by a user 142. The term engaged includes any arrangement where the adaptor and adhesive spreader tool work together to spread adhesive across a floor surface. Thus the term engage may include but is not limited to: fixing those elements together with any suitable fixing arrangement such as wire, nut and bolt, glue, clamp, or merely locating the adaptor over the adhesive spreader tool.

Also depicted is a handle engagement fixture 144 fixed to the body 120 of the adaptor 110. The handle engagement fixture comprises, in an embodiment, a reverse thread aperture into which the threaded end of a handle can be screwed. Reverse thread adaptors are common, and the choice of the adaptor is a matter up to the designer, since the choice may affect the popularity of the adaptor since some handles are more popular and more readily available than others. The body partly forming the reverse thread aperture has a base which is fixed to a surface of the body 120 by fixing elements, such as screws, rivets, tongue and groove or any other fixing means suitable to withstand the forces involved. The material of the handle engagement fixture is typically plastic and can preferably be ABS plastic. A suitable handle engagement fixture may be available off-the-shelf. The handle engagement fixture could, in a further embodiment, be a tongue and groove arrangement or a post end and sliding engagement arrangement, as long as the arrangements are strong and durable.

FIG. 14 also depicts the spread adhesive 146, which lies in evenly spaced rows of adhesive roughly 15 mm by 15 mm height and width and the rows being roughly 15 mm apart. Depending on the consistency of the adhesive, the square profile of the row may slump slightly.

FIG. 15 depicts a handle 140 attached to an embodiment of an adaptor 110 having longitudinal support members 150 and 152 extended equally laterally of the adaptor. The handle is depicted engaged with an embodiment of the adhesive spreader tool 110 and in use by a user 142. The first and second longitudinal support members are arranged to span the full width of a tile that is to be laid. The tile width of each job can be different, and the adaptor is adaptable to accommodate most tile widths.

Wherein in use, the handle 140 is engaged with the handle engagement fixture 144 and the downwardly facing aperture 112 of the hollow capture volume 114 is slid over the second edge 14 of the substantially planar adhesive spreader tool 10 so that the leading edge 116 of the barrier 118 is located against the planar rear surface 60 of the adhesive spreader tool and the second upper edge of the adhesive spreader tool is located against a wall of the hollow capture volume, so that when the handle is pulled by a user of the adhesive spreader tool, the adhesive spreader tool is maintained substantially vertical with respect to the floor surface and the handle is orientated at an acute angle Ø to the plane of the floor surface.

Figure 16A:
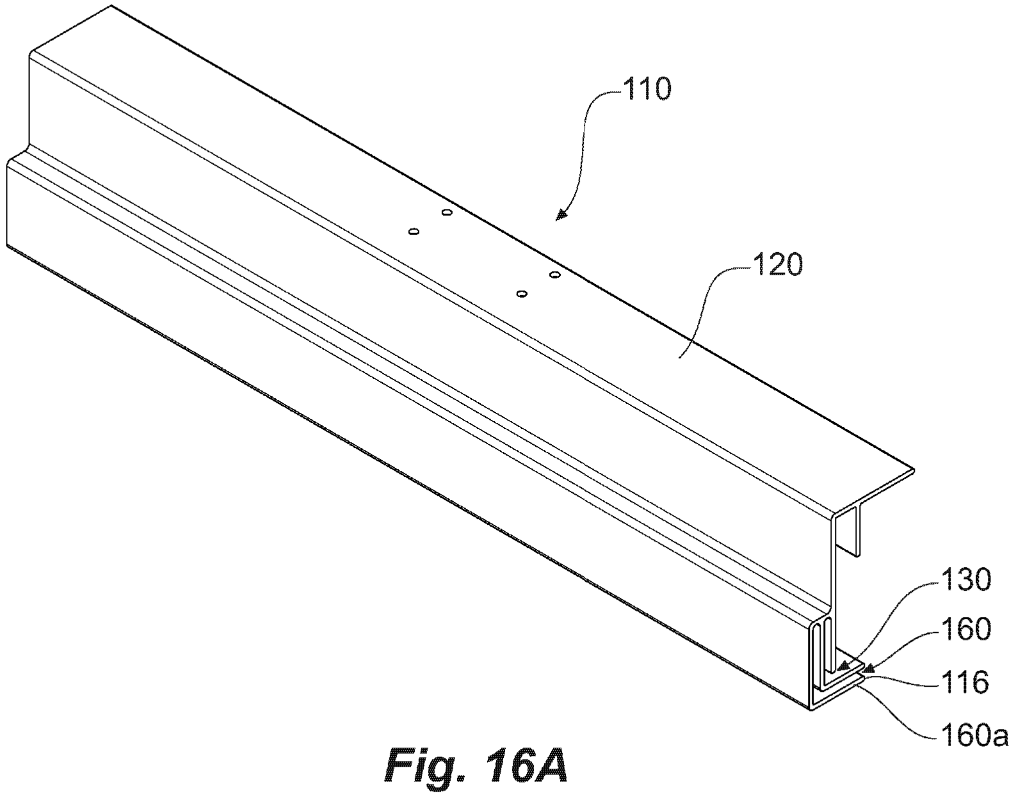
FIG. 16A depicts a side perspective view of a further embodiment of an adaptor for attachment to a handle for use with an embodiment of an adhesive spreader tool as disclosed herein.

FIG. 16A depicts some of the same features described in regards to FIG. 11 but depicts an alternative embodiment, wherein there are now two longitudinal channels 130 and 160. One channel 130 carries a longitudinal support member 132 and the other channel 160 carries a longitudinal support member 162.

Figure 16B:
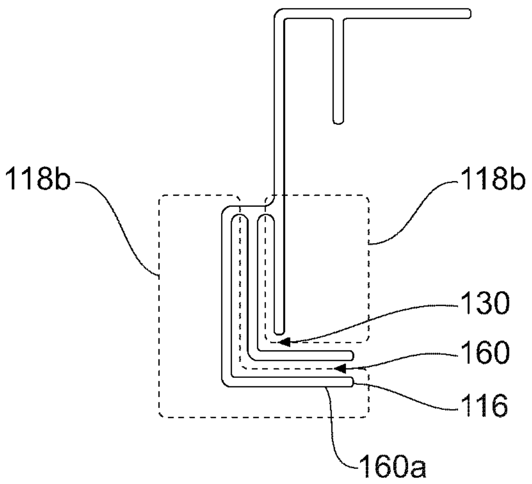
FIG. 16B depicts a side view of the embodiment depicted in FIG. 16A for use with an embodiment of an adhesive spreader tool as disclosed herein.

FIG. 16B is used to depict an embodiment of at least two longitudinal wall structures (dotted lines surrounding features 118*a* and 118*b*) spaced to form one or more longitudinal channels 130 and 160 extending between a first and a second end of the longitudinal wall structures wherein the channel or channels are open at each end and at least a portion of one of the further longitudinal wall structures forms an abutment surface 116.

Figure 16C:
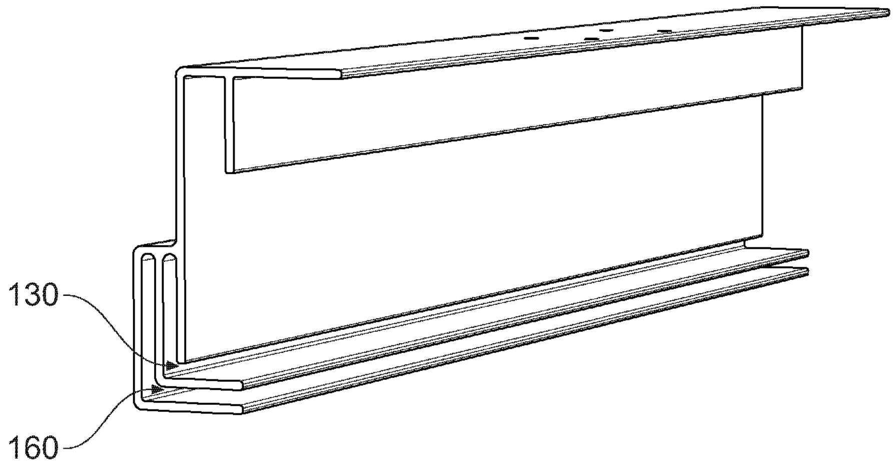
FIG. 16C depicts a perspective view of a portion of the embodiment depicted in FIG. 16A showing longitudinal wall structures absent longitudinal support members.
Figure 16D:
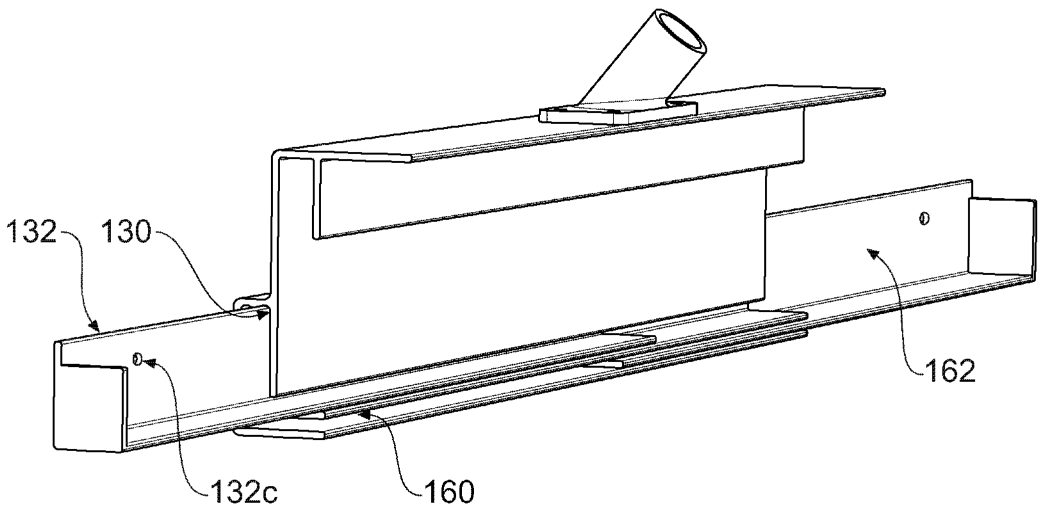
FIG. 16D depicts a perspective view of one end of a portion of the embodiment depicted in FIG. 16A showing longitudinal wall structures and one longitudinal support member located in a channel formed by two of those longitudinal wall structures.
Figure 16E:
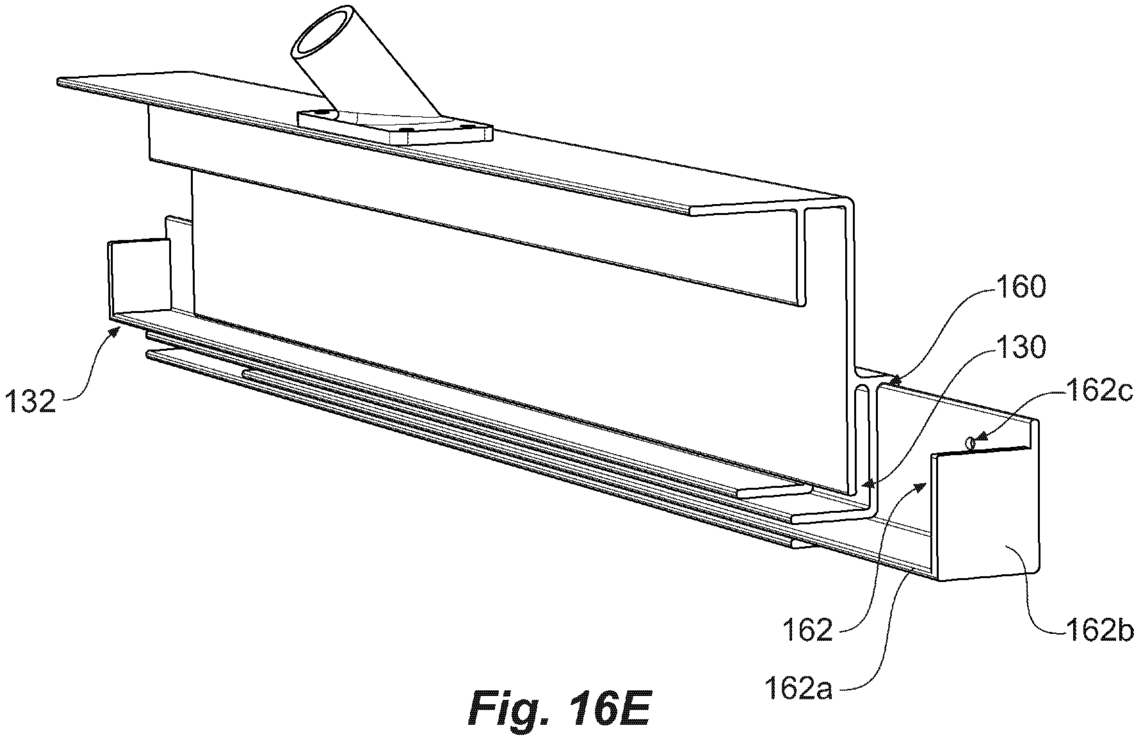
FIG. 16E depicts a perspective view of the other end of a portion of the embodiment depicted in FIG. 16A and FIG. 16D showing the same longitudinal wall structures and a further longitudinal support member located in another channel formed by the longitudinal wall structures.
Figure 16F:
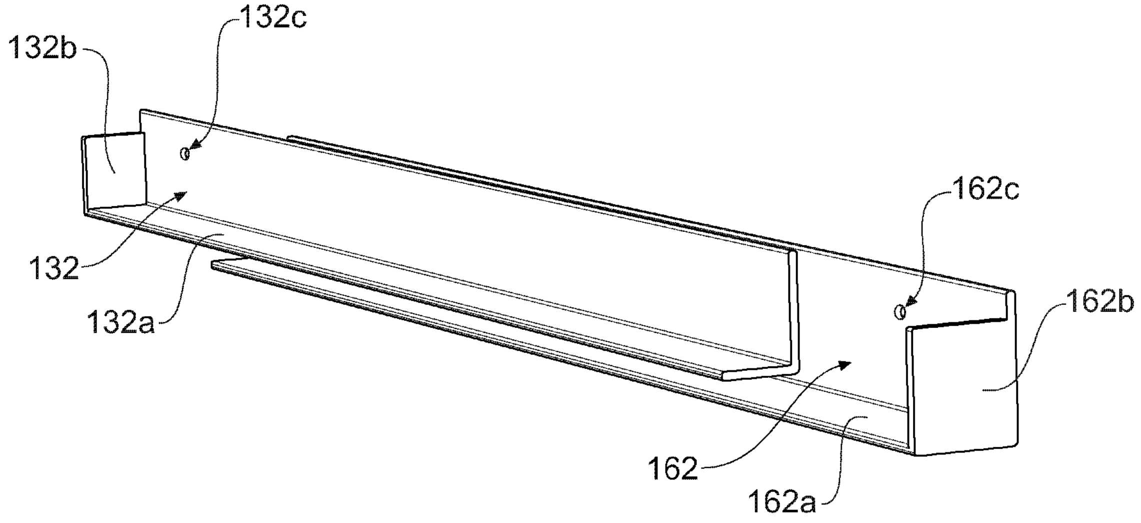
FIG. 16F depicts a top view of the longitudinal support member which also shows that the width of one of the longitudinal support members is wider than the other longitudinal support member.

In the arrangement disclosed in FIGS. 16A to 16F, the dimension of the longitudinal support member 162 which is nominally the element used within a channel (channel 160) there is a bottom longitudinal support member 162*a* wider than the support member 132*a* as depicted in FIG. 16F. For the embodiments disclosed thus far, one of the longitudinal support members (162) has a size and configuration different to the other of the longitudinal support member (132) such that when extended out of their respective channels 160 and 130, both longitudinal support members abut a rear wall of the adhesive spreader tool 10' and 10" much like that depicted in FIG. 15 (which is of another embodiment but the illustration is consistent with the effect). Thus, both longitudinal support members 162 and 132 abut the rear wall of the adhesive spreader tool 10 so that the tool can spread adhesive over the floor surface after adhesive is placed between the end walls B and B' of respective first and second longitudinal support members (FIG. 15). It is also possible and advantageous to fix the longitudinal support members 162 and 132 to the adhesive spreader tool to stiffen it at the wide extremes of the adhesive spreader tool.

FIG. 16C depicts a perspective view of the channels 130 and 160 without the longitudinal support members in a respective channel. FIG. 16D depicts a perspective view of channel 130 occupied by longitudinal support member 132. FIG. 16E depicts a perspective view of the channels 130 and 160 and channel 160 is occupied by longitudinal support members 162. FIG. 16F depicts a top view of the longitudinal support members 130 and 162 which shows that the width of the base 162*a* of the longitudinal support member is wider than the base 132*a* of the longitudinal support members 132. FIG. 16F also depicts that there are end stops 162B and 132B on respective externally located ends of the longitudinal support members 160 and 130 which stop those longitudinal support members completely entering their respective channels 130 and 160.

FIGS. 16D and 16E also depict apertures 132*c* and 162*c* respectively wherein the longitudinal support members are fixed to the adhesive spreader tool 10 at the ends of the longitudinal support members so as to stabilise the tool and ensure proper spreading of the adhesive across the full width of the longitudinal support members. The fixing can be achieved using screws, bolts, and any other suitable fixing arrangement.

Figure 17A:
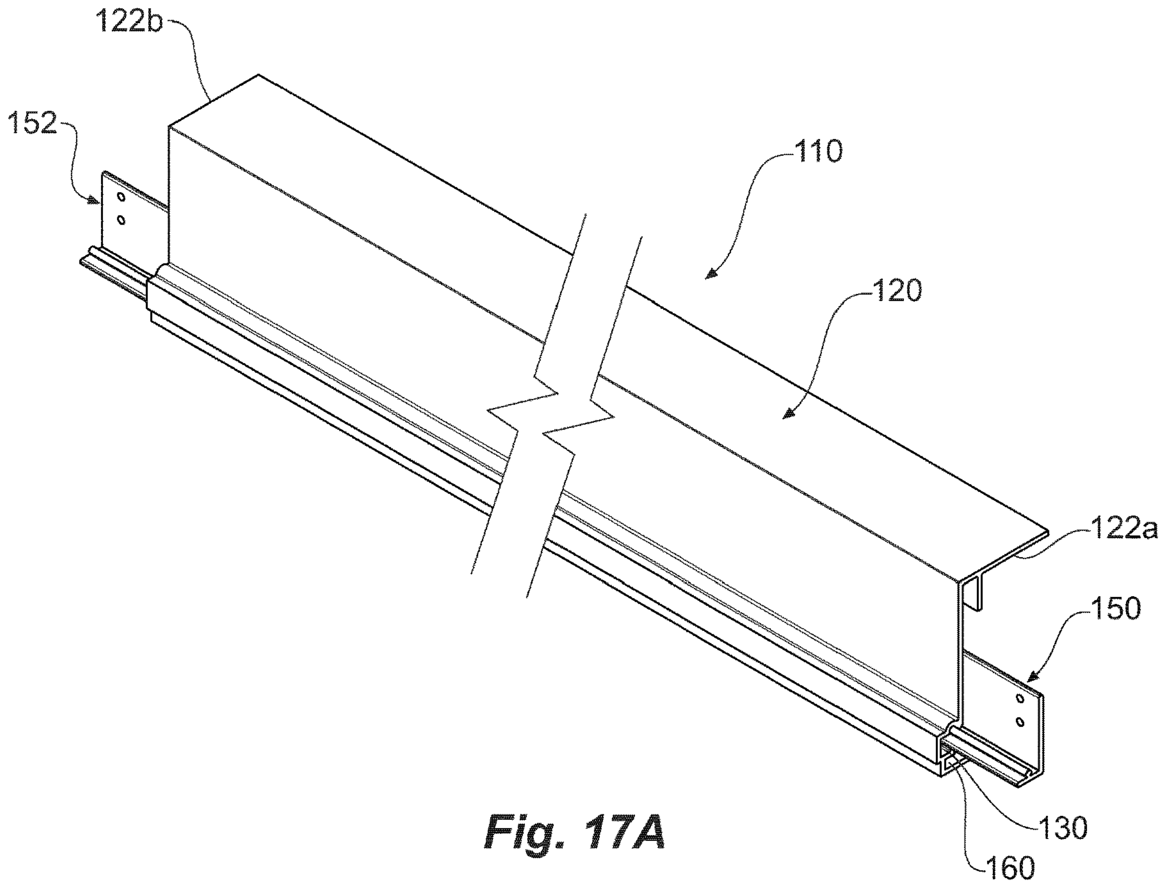
FIG. 17A depicts a front perspective view of yet a further embodiment of an adaptor for attachment to a handle for use with an embodiment of an adhesive spreader tool as disclosed herein but only depicting a portion of the adaptor and a portion of each longitudinal support member.

FIG. 17A depicts a front perspective view of yet a further embodiment of an adaptor 110 for attachment to a handle (not shown) for use with an embodiment of an adhesive spreader tool as disclosed herein but only depicting a portion of the adaptor (not its full width as illustrated by the jagged line intermediate the ends 122*a* and 122*b* of the adhesive spreader tool) and a portion (not the full length of each longitudinal support member 150 and 152). The cross-sectional or end view of FIG. 17E depicts the arrangement of each longitudinal support member supported within a respective channel. In the embodiment depicted in FIGS. 17A to 17Q each longitudinal support member is adapted to be longitudinally slidable within a respective channel of the one or more channels, so that a portion of the first longitudinal support member is external of the open end of the respective channel.

Figure 17B:
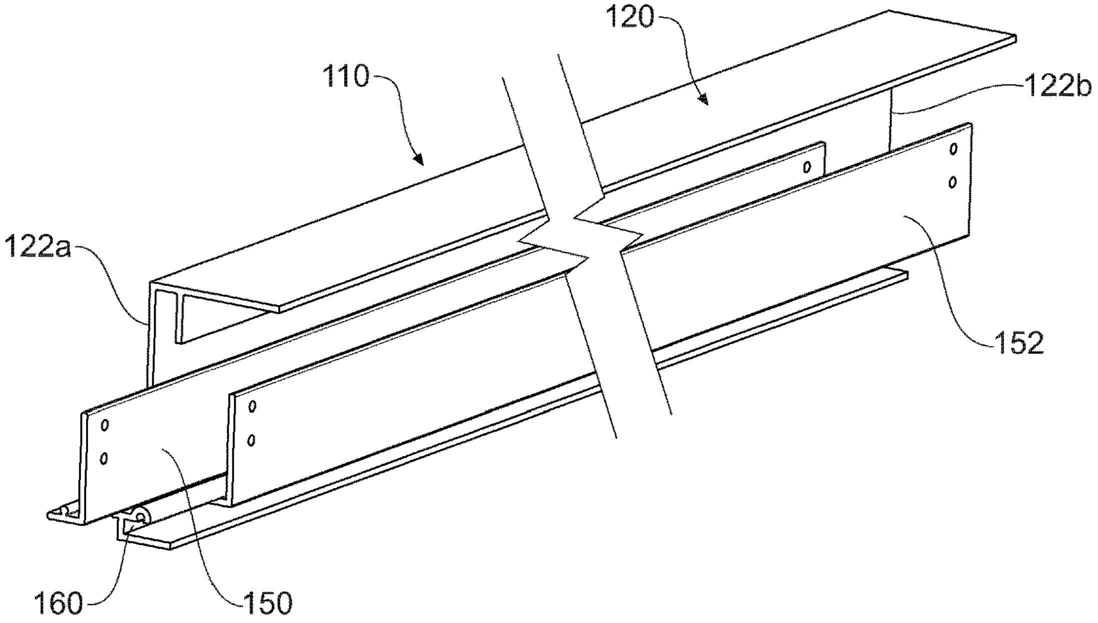
FIG. 17B depicts a rear perspective view of the adaptor of FIG. 17A.

FIG. 17B depicts a rear perspective view of the adaptor of FIG. 17A each longitudinal support member within a respective channel. FIG. 17B depicts first longitudinal support member 150 is longitudinally slidable within the channel 130 (FIG. 17A) so that a portion thereof is external of the channel and extends longitudinally beyond the first end 122*a* of the longitudinal body 120. FIG. 17B also depicts a second longitudinal support member 152 (as depicted in FIGS. 17A and 17B) is longitudinally slidable within the channel 160 so that a portion thereof is external of the channel and extends longitudinally beyond the second end 122*b* of the longitudinal body 120. FIG. 17B (and as is not shown in the other Figures in the series of FIG. 17) show the support members as being of indefinite length by the use of a jagged line intermediate their ends. The length of the extendable support members can be supplied in different lengths and in use and in place on the adaptor they slide past each other.

Figure 17C:
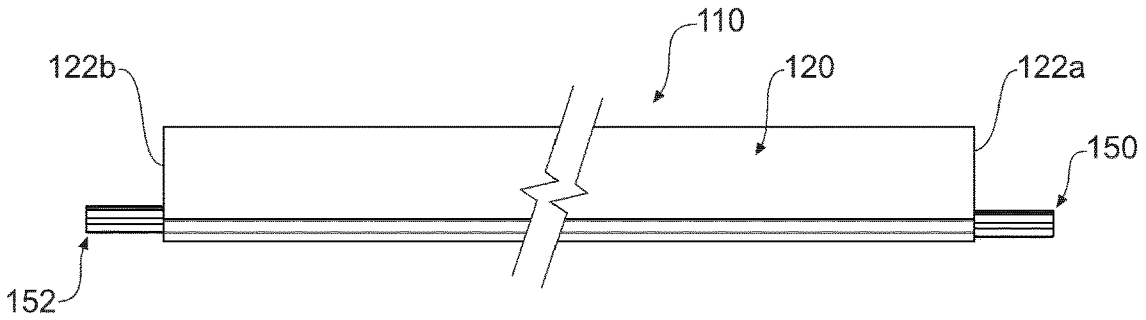
FIG. 17C depicts a top view of the adaptor of FIG. 17A.

FIG. 17C depicts a top view of the adaptor of FIG. 17A.

Figure 17D:
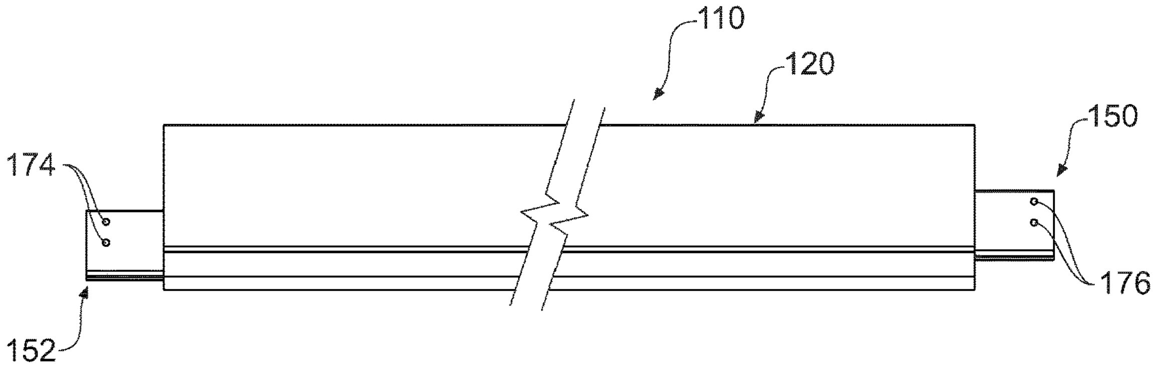
FIG. 17D depicts a front view of the adaptor of FIG. 17A.
Figure 17E:
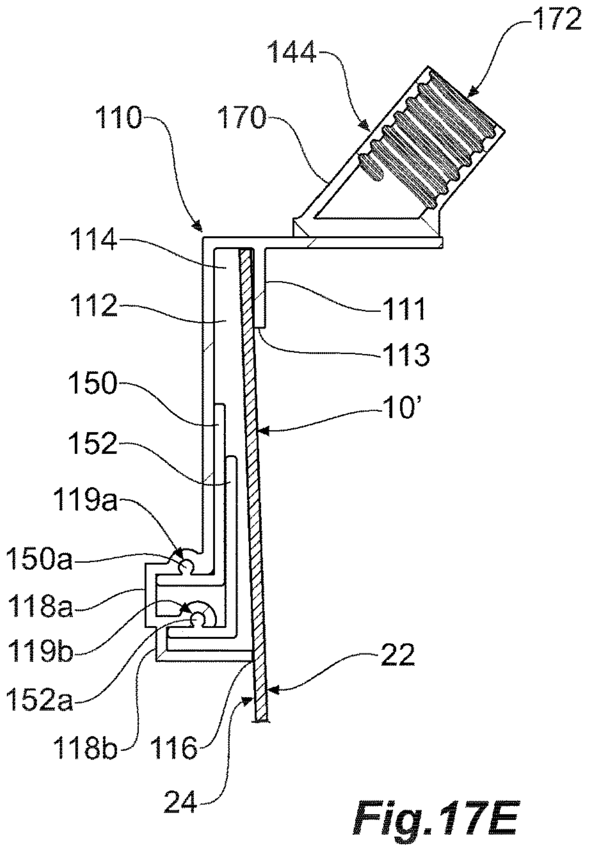
FIG. 17E depicts a cross-sectional view of the adaptor and slidable first and second longitudinal support members of FIG. 17A.

FIG. 17D depicts a front view of the adaptor of FIG. 17A.

FIG. 17E depicts a cross-sectional view of the adaptor 110 and slidable first and second longitudinal support members 150 and 152 of FIG. 17A. Depicted in FIG. 17E are two further longitudinal wall structures 118*a* and 118*b* spaced to form two longitudinal channels extending between a first and a second end of the longitudinal wall structures 118*a* and 118*b* wherein the channel or channels are open at each end and at least a portion of one of the further longitudinal wall structures forms an abutment surface 116.

A handle engagement fixture 144 is depicted in FIG. 17E and comprises, in an embodiment, body 170, a reverse thread aperture 172 into which a complementarily threaded end of a handle (not shown) can be screwed. Also depicted is a cross-sectional view of a portion of the adhesive spreader 10 located in the adaptor 110.

Specifically in the embodiment depicted in FIG. 17E the upper portion of the adhesive spreader 10 is located in the hollow capture volume 114 so that the leading edge portion 113 of the first longitudinal barrier 111 abuts against the front surface 22 of the adhesive spreader tool 10 and the rear surface 24 of the adhesive spreader abuts the abutment surface of at least one of the further longitudinal wall structures in the region of the adaptor and possibly also along all or portions of the first and second support members 150 and 152, so that when a user of the tool pulls the handle, the adhesive spreader tool is maintained substantially vertical with respect to the floor surface, and the handle is orientated at an acute angle to the planar floor surface. Further, the extended first and second support members 150 and 152 assist to resist curvature of the adhesive spreader tool which is tasked with dragging a maximum volume of adhesive across the floor surface at the beginning of the adhesive spreading task.

Also depicted in FIG. 17E is tongue 150*a* incorporated into the body of the longitudinal support member 150 and longitudinal tongue 152*a* incorporated into the body of the longitudinal support member 152, which are respectively slidably engaged with a longitudinal groove 119*a* incorporated with longitudinal wall structure 118*a* and a longitudinal groove 119*b* incorporated with longitudinal wall structure 118*b*. The respective first and second longitudinal support members 150 and 152 thus are able to slide within longitudinal wall structures spaced to form one or more longitudinal channels 130 and 160.

Figure 17F:
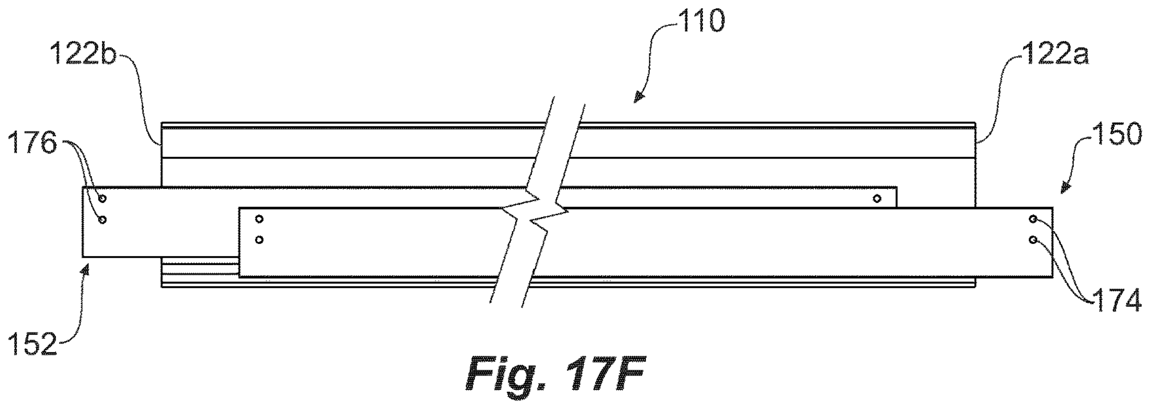
FIG. 17F depicts a rear view of the adaptor of FIG. 17A.

FIG. 17F depicts a rear view of the adaptor of FIG. 17A and depicts holes 174 and 176 at the outermost ends of support members 150 and 152. In this embodiment the holes correspond with at least one of the holes in the two parts of the adhesive spreader tool 10' and 10" and should be aligned and fixed to create a firm and rigid support to the spreader. Such an arrangement stiffens the spreader tool and restricts flexing and by doing maintains the even distribution of the adhesive.

Figure 17G:
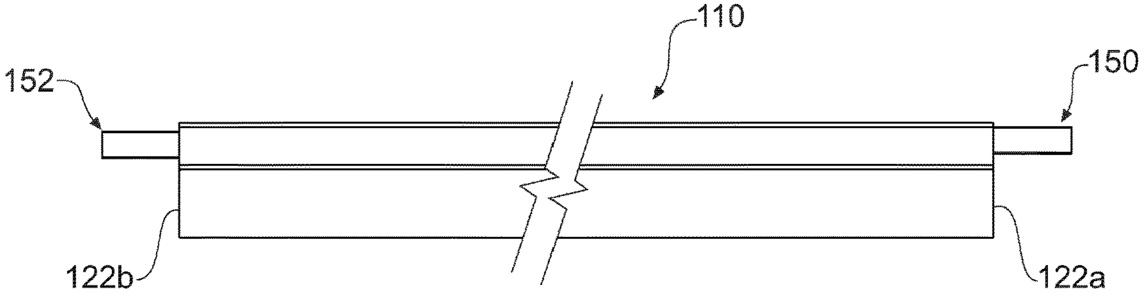
FIG. 17G depicts a bottom view of the adaptor of FIG. 17A.
Figure 17H:
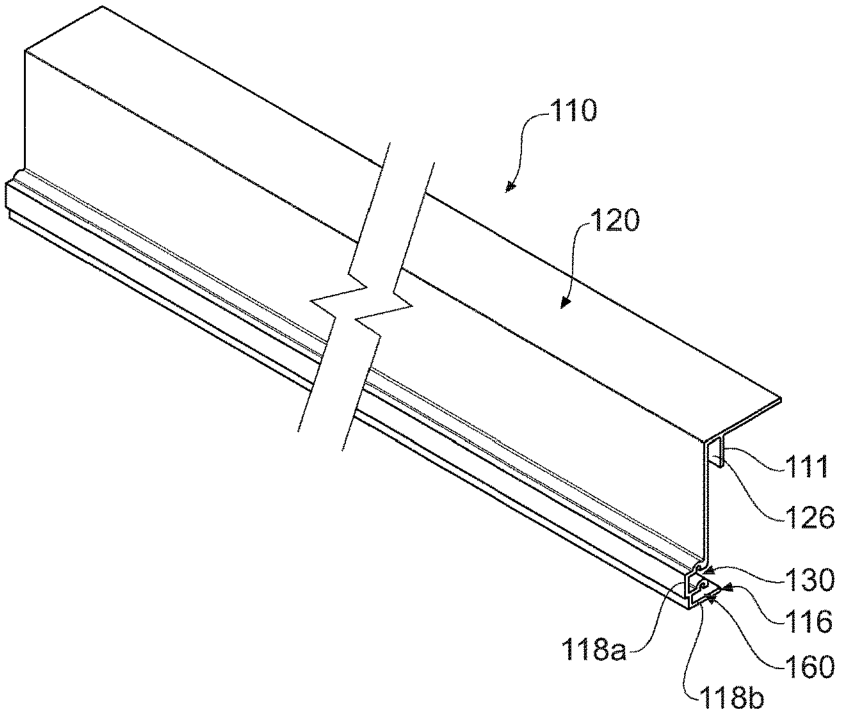
FIG. 17H depicts a front perspective view of the adaptor of FIG. 17A absent each longitudinal support member.

FIG. 17G depicts a bottom view of the adaptor of Figure. FIG. 17H depicts a front perspective view of the adaptor of FIG. 17A absent each longitudinal support member.

Figure 17I:
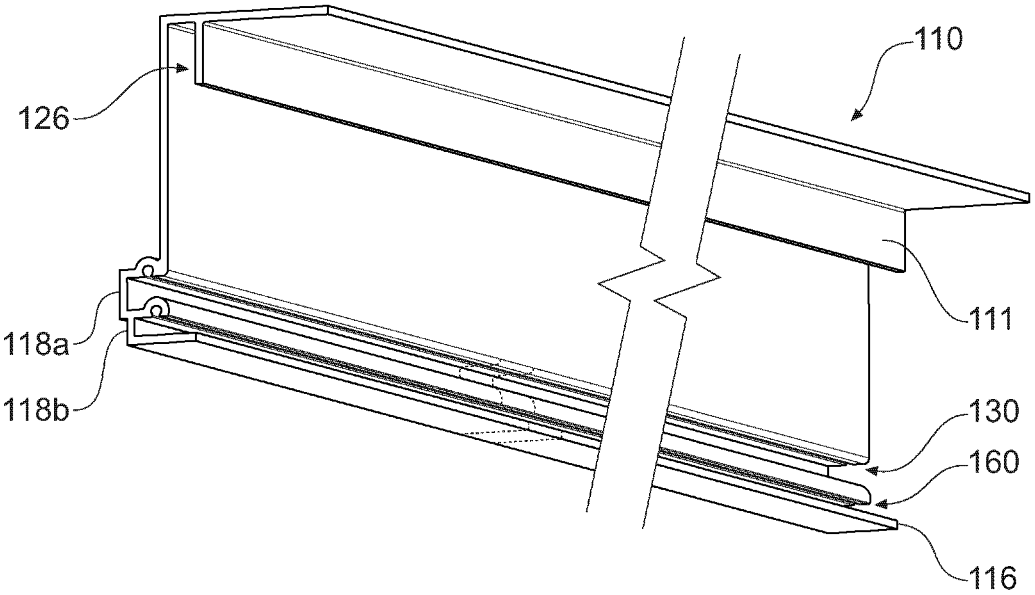
FIG. 17I depicts a rear perspective view of the adaptor of FIG. 17A absent each longitudinal support member.

FIG. 17I depicts a rear perspective view of the adaptor of FIG. 17A absent each longitudinal support members and depicting a first longitudinal barrier 111 forming a longitudinal channel 126 open at each end of the adaptor, and two longitudinal wall structures 118*a* and 118*b* spaced to form one or more longitudinal channels 136 and 160 open at each end of the adaptor. The two longitudinal wall structures need not be contiguous along the longitudinal axis of the adaptor to perform their function of supporting and guiding the first and second longitudinal support members 150 and 152 (not shown in FIG. 17I). Dotted lines are used to illustrate one section of those wall structures which can be removed.

Figure 17J:
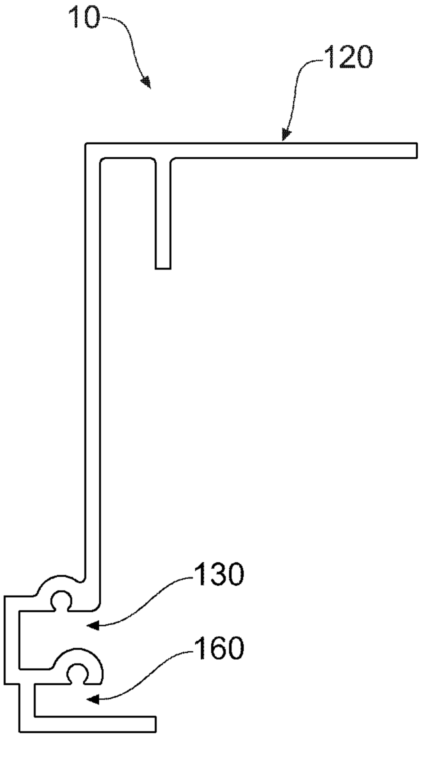
FIG. 17J depicts a side cross-sectional view of the adaptor of FIG. 17A absent longitudinal support members.
Figure 17K:
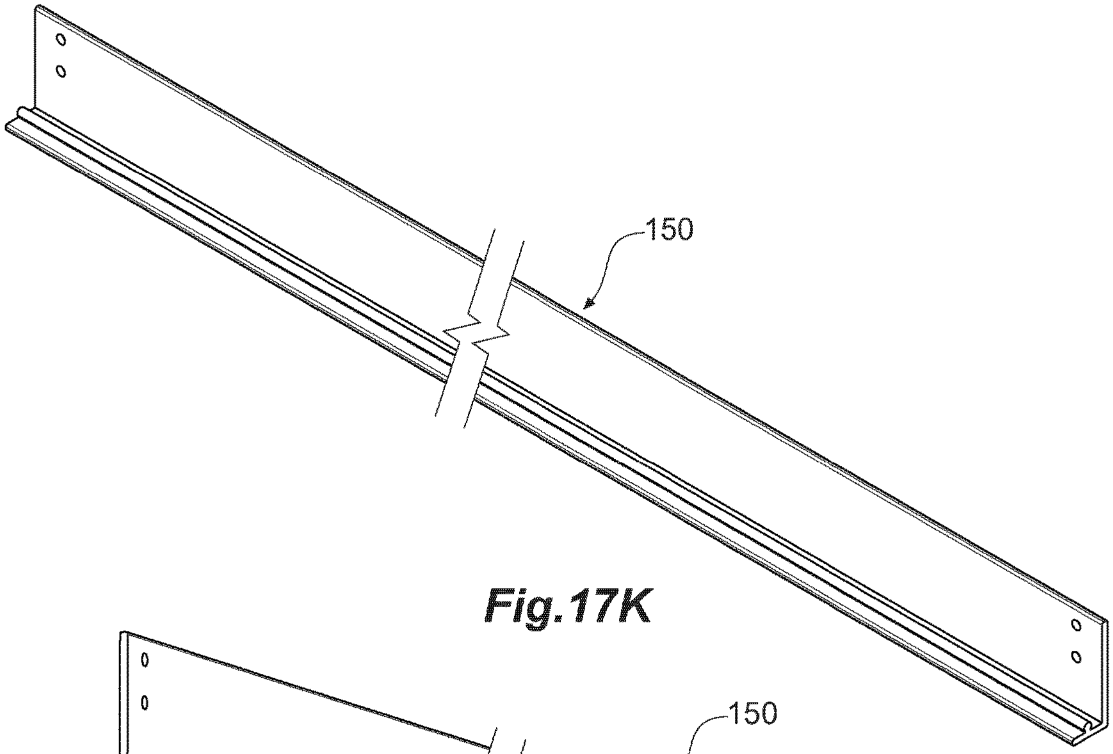
FIG. 17K depicts a front perspective view of a portion of a longitudinal support member suitable for the adaptor of FIG. 17A.
Figure 17L:
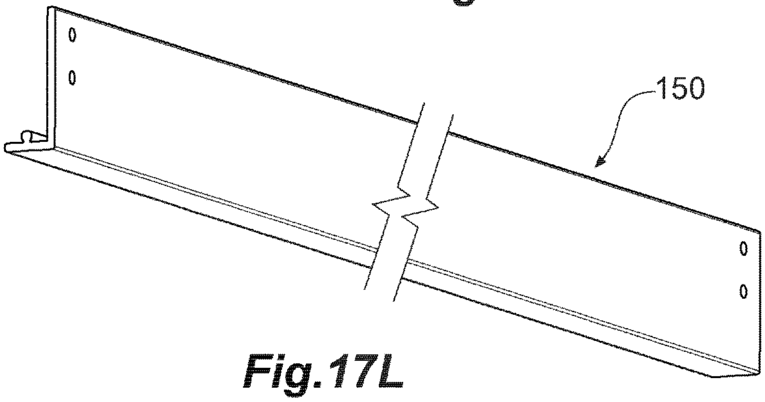
FIG. 17L depicts a bottom rear perspective view of a portion of a longitudinal support member of FIG. 17K.
Figure 17M:
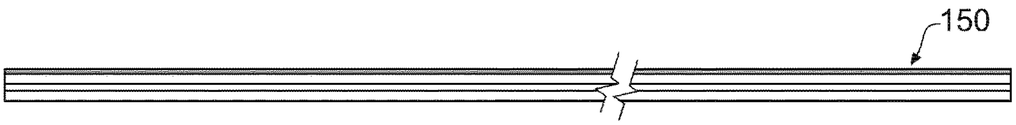
FIG. 17M depicts a top view of a portion of a longitudinal support member of FIG. 17K.
Figure 17N:
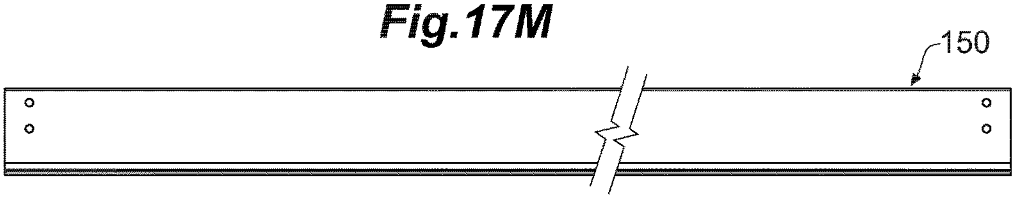
FIG. 17N depicts a front view of a portion of the longitudinal support member of FIG. 17K.
Figure 17O:
FIG. 17O depicts a side view as well as a cross-sectional view of the longitudinal support member of FIG. 17K.
Figure 17P:
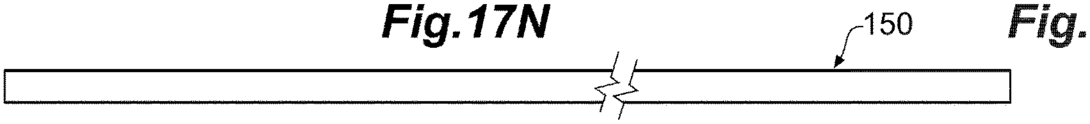
FIG. 17P depicts a rear view of a portion of the longitudinal support member of FIG. 17K.
Figure 17Q:
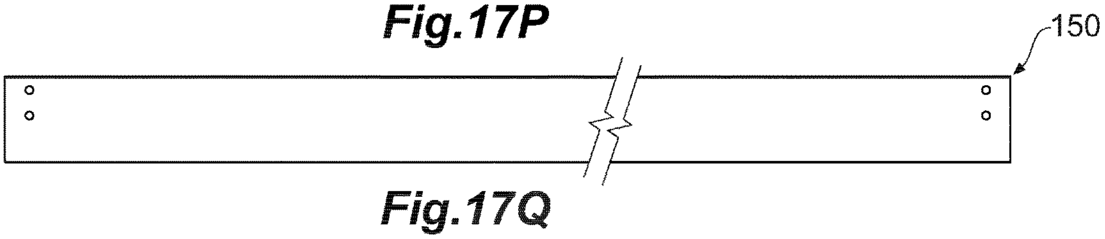
FIG. 17Q depicts a bottom view of a portion of the longitudinal support member of FIG. 17K.

FIG. 17J depicts a side cross-sectional view of the adaptor of FIG. 17A absent longitudinal support members. FIG. 17K depicts a front perspective view of a portion of a longitudinal support member suitable for the adaptor of FIG. 17A. FIG. 17L depicts a bottom rear perspective view of a portion of a longitudinal support member of FIG. 17K. FIG. 17M depicts a top view of a portion of a longitudinal support member of FIG. 17K. FIG. 17N depicts a front view of a portion of the longitudinal support member of FIG. 17K. FIG. 17O depicts a side view as well as a cross-sectional view of the longitudinal support member of FIG. 17K. FIG. 17P depicts a rear view of a portion of the longitudinal support member of FIG. 17K, and FIG. 17Q depicts a bottom view of a portion of the longitudinal support member of FIG. 17K.

The invention claimed is:

1. An adaptor for attachment to a handle, the adaptor for use with an adhesive spreader tool for a spreading adhesive over a floor surface, the adhesive spreader tool having an upper longitudinal edge and between the two ends of the adhesive spreader tool there being front and rear planar surfaces, the adaptor comprising:

a longitudinal body comprising

- a first longitudinal barrier defining a hollow capture volume and a leading edge portion of the barrier forming one side of an entrance to the hollow capture volume, the longitudinal barrier extending between first and second ends of the longitudinal barrier and having open first and second ends;
- at least two longitudinal wall structures spaced to form one or more longitudinal channels extending between a first and a second end of the longitudinal wall structures wherein the channel or channels are open at each end and at least a portion of one of the longitudinal wall structures forms an abutment surface;
- a first longitudinal support member adapted to be longitudinally slidable within a first channel of the one or more channels, so that a portion of the first longitudinal support member is external of the open end of the first channel;
- a second longitudinal support member adapted to be longitudinally slidable within the first channel or a second channel of the one or more channels, so that a portion of the second longitudinal support member is external of the open end of the respective channel, wherein the external portions of the longitudinal support members longitudinally extend substantially parallel to the longitudinal body, and the longitudinal support members slide past each other while within their respective channel, wherein the upper longitudinal edge of the adhesive spreader tool is locatable in the hollow capture volume of the first longitudinal barrier; and wherein each longitudinal support member has a longitudinal tongue and the least two further longitudinal wall structures spaced to form at least two longitudinal channels extending between a first and a second end of the further longitudinal wall structures each have a longitudinal channel adapted to slidingly accommodate the tongue of a respective longitudinal support member located in a respective longitudinal channel.

2. An adaptor according to claim 1 further comprising:

a handle engagement fixture fixed to the body;

wherein in use, the handle is engaged with the handle engagement fixture, and the upper longitudinal of the adhesive spreader tool is located in the hollow capture volume so that the leading edge portion of the barrier abuts against the front planar surface of a front wall of the adhesive spreader tool and a rear wall of the adhesive spreader abuts the abutment surface of at least one of the further longitudinal wall structures, so that when a user of the tool pulls the handle, the planar front and rear walls of the adhesive spreader tool are maintained substantially vertical with respect to the floor surface and the handle is orientated at an acute angle to the substantially planar floor surface.

3. An adaptor according to claim 1 wherein each of the longitudinal support members are fixed to the adhesive spreader tool.

4. An adhesive spreader tool assembly comprising the adapter according to claim 1, engaged with the handle and the adhesive spreader tool as claimed in claim 1.

5. A method of spreading adhesive over a floor surface using an adaptor as claimed in claim 1 in preparation for a tile to be laid, comprises the steps:

a. adjusting the first and second longitudinal supports to the width of the tile to be laid, b. abutting the longitudinal castellated surface abutting edge of the adhesive spreader tool with a floor surface;

c. placing adhesive between side barriers of the adhesive spreader tool; and d. dragging the adaptor and adhesive spreader tool while maintaining the longitudinal castellated surface abutting edge of the adhesive spreader tool in sliding abutment with the floor surface across a surface of the floor to be tiled to allow the adhesive to seep between the castellations and leave a bed of castellated adhesive over a portion of the surface of the floor.

* * * * *